(12) United States Patent
Moses et al.

(10) Patent No.: US 7,788,199 B2
(45) Date of Patent: Aug. 31, 2010

(54) METHOD AND APPARATUS FOR DISTRIBUTING ASSIGNMENTS

(75) Inventors: Eyal Moses, Jerusalem (IL); Gilad Weitman, Rishon LeZion (IL); Amnon Glaser, Nesher (IL)

(73) Assignee: Elbit Systems Ltd., Haifa (IL)

( * ) Notice: Subject to any disclaimer, the term of this patent is extended or adjusted under 35 U.S.C. 154(b) by 612 days.

(21) Appl. No.: 11/658,747

(22) PCT Filed: Jan. 18, 2006

(86) PCT No.: PCT/IL2006/000074

§ 371 (c)(1),
(2), (4) Date: Jan. 29, 2007

(87) PCT Pub. No.: WO2006/080003

PCT Pub. Date: Aug. 3, 2006

(65) Prior Publication Data

US 2009/0012923 A1    Jan. 8, 2009

Related U.S. Application Data

(60) Provisional application No. 60/668,608, filed on Apr. 6, 2005.

(30) Foreign Application Priority Data

Jan. 30, 2005    (IL) .................................... 166565

(51) Int. Cl.
*G06F 17/00* (2006.01)
*G06N 5/02* (2006.01)

(52) U.S. Cl. .................... 706/46; 706/45; 706/47

(58) Field of Classification Search .............. 718/102
See application file for complete search history.

(56) References Cited

U.S. PATENT DOCUMENTS

| 6,212,666 B1 * | 4/2001 | Gohl et al. ............... 716/6 |
| 6,516,453 B1 * | 2/2003 | Knapp ..................... 716/6 |
| 2004/0136379 A1 * | 7/2004 | Liao et al. ........... 370/395.21 |
| 2004/0158832 A1 | 8/2004 | Chechik et al. |

(Continued)

OTHER PUBLICATIONS

Michel Lemaitre et al., Daily management of an earth observation satellite: comparison of Ilog Solver with dedicated algorithms for Valued Constraint Satisfaction Problems, Jul. 1997, ILOG, 1-9.*

(Continued)

*Primary Examiner*—Joseph P Hirl

(57) ABSTRACT

A method of assigning sets of assignments to at least one agent is provided. The agent(s) are capable of assuming a plurality of states. The method comprising, for each agent: constructing a graph having a plurality of vertices and a plurality of edges. Each vertex of the graph represents an assignment performable by the agent while being at a respective state, and each edge connects two vertices hence represents a transition between two states. The method further comprises assigning a predetermined weight for each vertex of the plurality of vertices; and using a longest-path algorithm for obtaining a path over the graph, the path having a plurality of connected vertices and being characterized by a substantial optimal objective function defined using respective weights of the plurality of connected vertices. The agent is thereby assigned with a set of assignments represented by the plurality of connected vertices of the graph.

52 Claims, 12 Drawing Sheets

U.S. PATENT DOCUMENTS

2004/0225970 A1* 11/2004 Oktem ........................ 716/1
2005/0125748 A1* 6/2005 Gray et al. .................... 716/2

OTHER PUBLICATIONS

Michael Lemaitre et al., Selecting and scheduling observations of agile satellites, 2002, Aerospace Science and Technology, 365-381.*

Brian J. Capozzi, Evolution-Based Path Planning and Management for Autonomous Vehicles, 2001, University of Washington, 1-325.*

Capozzi "Evolution-Based Path Planning and Mangement for Autonomous Vehicles", University of Washington, Retrieved From the Internet: http://www.aa.washington.edu/research/afsl/publications/capozzi2001thesis.pdf, Feb. 22, 2008. Chaps.1.1, 5, 6, 9.

De Givry et al. "Bounding the Optimum of Constraint Optimization Problems", Principles and Practice of Constraint Programming—CP97, Third International Conference, Linz, Austria, 405-419, 1997.

Lemaître et al. "Daily Management of An Earth Observation Satellite: Comparison of ILOG Solver With Dedicated Algorithms for Valued Constraint Satisfaction Problems", Third ILOG International Users Meeting, Paris France, p. 1-9, 1997.

Lemaître et al. "Selecting and Scheduling Observations of Agile Satellites", Aerospace Science and Technology, 6: 367-381, 2002.

Wolfe et al. "Three Scheduling Algorithms Applied to the Earth Observing Systems Domain", Management Science, 46(1): 148-168, 2000.

* cited by examiner

METHOD AND APPARATUS FOR DISTRIBUTING ASSIGNMENTS

RELATED APPLICATIONS

This Application is a National Phase of PCT Patent Application No. PCT/IL2006/000074 having International Filing Date of Jan. 18, 2006, which claims the benefit of U.S. Provisional Patent Application No. 60/668,608 filed on Apr. 6, 2005 and Israel Patent Application No. 166565 Filed on Jan. 30, 2005. The contents of the above Applications are all incorporated herein by reference.

FIELD AND BACKGROUND OF THE INVENTION

The present invention relates to distributed resource allocation, and, more particularly, to a method and apparatus for distributing sets of assignments to at least one agents.

Distributed resource allocation is a known computer science framework, generally applicable to multi agent systems in which it is required to distribute a certain amount of assignments among a given set of agents during a given time. This framework is presently exploited in many real-life areas, including satellite mission management, scheduling, logistics, timetabling, transportation and the like. In earth observation satellite management, for example, daily decisions have to be made for allocating different earth observation satellite at different times to perform different tasks, such as capturing images. These decisions can be taken for a long term period (e.g., year, month) and/or for a short term period (e.g., week, day, activity window). In any event, the decisions are typically based on both past knowledge and future estimations and are subjected to a plurality of constraints.

In transportation, it is oftentimes required to use a given set of vehicles to deliver merchandise to a large number of destinations while satisfying a variety of local and global constraints, such as time, capacity, predetermined routes and the like.

Generally, distributed resource allocation belongs to a set of mathematical problems known as constraint optimization problems, which is formally defined over a set of variables and a set of constraints where a variable may draw its value from a predefined domain. The mathematical problem involves the assignment of a value to each variable while satisfying at least a subset of the constraints. This is typically performed by defining an objective function and searching for a plurality of values to the variables such as to minimize or maximize the objective function. Several techniques are known for obtaining a solution to a constraint optimization problem. Representative examples include, without limitation complete or local search methods, and evolutionary computation.

However, there are still many distributed resource allocation problems which cannot be satisfactorily resolved by conventional computation techniques. Particularly, in problems belonging to the NP-hard complexity class, the execution time of the computation grows rapidly with the size of the problem (faster than a polynomial growth). All the more so, to obtain a solution for real life NP-hard problems, one is oftentimes required to perform auxiliary analyses which are not required in pure mathematical models.

For example, in the aforementioned problem of earth observation satellite management, the solution process includes a trajectory analysis, which is typically performed by an auxiliary procedure such as a satellite simulator. It is recognized that even for a few passes of a single satellite, the number of possible scan combinations is enormous. This number becomes prohibitively high when multiple satellites are concerned, because each satellite moves along a different trajectory and can point its sensor(s) to more than one direction. For agile satellites, the complexity of the problem is further enhanced due to the propulsion system of each satellite which moves the satellite about in orbit and controls its attitude.

Additionally, the operations performed by a single satellite form an interdependent series, whereby an operation made by the satellite at a particular moment may affect operations performed thereafter. This interdependence may be physical and/or logical. Logical interdependency arises when the user relates two or more imaging requests to one another, as in the case of a request to scan several areas on the same day, or a request for stereo acquisition, in which the same area has to be covered from different perspectives. Physical interdependency results from maneuvering operations of the satellite required for pointing, energy constraints, recorder overflow and communication and calibration periods. These dependencies further constrain the management problem, because the list of targets that can be imaged at any given moment depends on previously imaged targets and/or future imaging opportunities. When both the plurality of sensor directions and the interdependencies are taken into account, fulfilling all the request parameters (e.g., deadline for taking the image) and working around external constraints become highly challenging.

Several attempts have been made to obtain a near-optimal solution to the problem of earth observation satellite management. These attempts generally include the use of incomplete optimization algorithms utilizing heuristics and simplifying assumptions on the original problem.

U.S. Patent application No. 20040158832 treats each slice of the total timeframe as a would-be starting point for the remainder of the process. Thus, out of the entire set of possible states of the satellite, only two subsets are processed: a state in the examined timeframe and a sequence of states in timeframes that have already been examined.

Lemaître et al. [Michel Lemaître and Gérard Verfaillie, "Daily Management of an Earth Observation Satellite: Comparison of ILOG Solver With Dedicated Algorithms for Valued Constraint Satisfaction Problems", Third ILOG International Users Meeting, Paris, France, 1997] formulate the earth observation satellite scheduling problem as a valued constrained satisfaction problem (VCSP). Specifically the problem is formulated using a set of variables (representing the images to be captured), a set of constrains and a mathematical valuation structure defined to assign a valuation for each constrain mirroring the importance one gives to its satisfaction. Approximate solutions to the problem were obtained using ILOG Solver™ commercial software and a special VCSP library.

Givry et al. [Simon de Givry, Gérard Verfaillie and Thomas Schiex, "Bounding the Optimum of Constraint Optimization Problems", Gert Smolka, ed.: Principles and Practice of Constraint Programming—CP97, Third International Conference, Linz, Austria, 1997, 405-419] employ an order morphism simplification function so as to simplify the VCSP problem and to build lower bounds to the optimal valuation of the problem.

Other prior art of relevance include Lemaÿtre M, Verfaillie G, Jouhaud F., Lachiver J-M and Bataille N, "Selecting and scheduling observations of agile satellites, Aerospace Science and Technology 2002, 6:367-381; and Wolfe W J and Sorensen S, "Three Scheduling Algorithms Applied to the Earth Observing Systems Domain", INFORMS Journal on Management Science, 2000. 46(1).

The solutions provided by prior art techniques are far from being satisfactory. For example, prior art techniques, although defining a set of constrains in their mathematical formulation, practically compromise on the number of constraints for each satellite, thereby fail to provide an adequate solution to the problem.

There is thus a widely recognized need for, and it would be highly advantageous to have a method and apparatus for distributing sets of assignments to a plurality of agents, devoid the above limitations.

SUMMARY OF THE INVENTION

According to one aspect of the present invention there is provided a method of assigning sets of assignments to at least one agent. The agent(s) are capable of assuming a plurality of states. The method comprising, for each agent: constructing a graph having a plurality of vertices and a plurality of edges. Each vertex of the graph represents an assignment performable by the agent while being at a respective state, and each edge connects two vertices hence represents a transition between two states. The method further comprises assigning a predetermined weight for each vertex of the plurality of vertices; and using a longest-path algorithm for obtaining a path over the graph, the path having a plurality of connected vertices and being characterized by a substantial optimal objective function defined using respective weights of the plurality of connected vertices. The agent is thereby assigned with a set of assignments represented by the plurality of connected vertices of the graph.

According to further features in preferred embodiments of the invention described below, at least one agent comprise at least one satellite. According to still further features in the described preferred embodiments at least a few states of the plurality of states describe a trajectory of the at least one satellite. According to still further features in the described preferred embodiments at least a few states of the plurality of states correspond to different orientations of the satellite at a first location.

According to still further features in the described preferred embodiments at least one assignment comprises a capture of an image of a predetermined area.

According to still further features in the described preferred embodiments the image is characterized by at least one parameter selected from the group consisting of a location, a size, an envelope shape, a resolution and a priority. According to still further features in the described preferred embodiments the image is characterized by an acquisition type (e.g., mono acquisition, stereo acquisition).

According to another aspect of the present invention there is provided a method of assigning sets of assignments to at least one satellite. The method comprising, for each satellite: determining a trajectory of the satellite; constructing a graph having a plurality of vertices and a plurality of edges, wherein each vertex represents an assignment performable by the satellite while being located at a location along the trajectory, and each edge connects two vertices, hence represents a propagation of the satellite between two locations along the trajectory. The method further comprises assigning a predetermined weight for each vertex of the plurality of vertices; and using a longest-path algorithm for obtaining a path over the graph, the path having a plurality of connected vertices and being characterized by a substantial optimal objective function defined using respective weights of the plurality of connected vertices; thereby assigning to the satellite a set of assignments represented by the plurality of connected vertices of the graph.

According to further features in preferred embodiments of the invention described below, the method further comprises using the trajectory for defining, for each assignment, a time window at which the assignment is performable by the satellite.

According to still further features in the described preferred embodiments the method further comprises discretizing each time window thereby obtaining a plurality of time instants, respectively corresponding to a plurality of locations of the satellite along the trajectory.

According to still further features in the described preferred embodiments the method further comprises defining additional vertices of the graph in a manner such that each vertex of the graph represent a different combination of time instant and orientation of the satellite.

According to still further features in the described preferred embodiments the method further comprising subdividing at least one assignment of the plurality of assignment into a plurality of sub-assignments.

According to still further features in the described preferred embodiments the construction of the graph comprises generating a vertex for each sub-assignment of the plurality of sub-assignments.

According to still further features in the described preferred embodiments the method further comprising defining at least one collection of assignments having at least two assignments, the at least two assignments being performable by the agent while being at a single state of the plurality of states.

According to still further features in the described preferred embodiments the construction of the graph comprises generating a vertex for each collection of the at least one collection of assignments.

According to still further features in the described preferred embodiments the method further comprising performing an accumulated resources test.

According to still further features in the described preferred embodiments the accumulated resources test is performed subsequently to the use of the longest-path algorithm.

According to still further features in the described preferred embodiments the accumulated resources test is performed contemporaneously with the use of the longest-path algorithm.

According to still further features in the described preferred embodiments the method further comprises reducing a size of the graph prior to the use of the longest-path algorithm.

According to still further features in the described preferred embodiments the reduction of the graph is effected by at least one reduction procedure selected from the group consisting of triangular inequality reduction and inferior edge elimination.

According to still further features in the described preferred embodiments the method further comprises alternating between the triangular inequality reduction and the inferior edge elimination in an iterative fashion.

According to still further features in the described preferred embodiments the longest-path algorithm comprises: storing a set of query-paths; and, for each query-path, calculating an objective function and using the objective function for accepting or rejecting an additional vertex and an additional edge to the query-path, thereby dynamically updating the set of query-paths.

According to still further features in the described preferred embodiments the method further comprises iteratively repeating the dynamical update of the set of query-paths.

According to still further features in the described preferred embodiments the obtaining the path comprises selecting a query-path having a substantial optimal objective function.

According to still further features in the described preferred embodiments the method further comprises issuing a report having a list of query-paths and corresponding objective functions.

According to still further features in the described preferred embodiments the storing of set of query-paths comprises constructing a square matrix having a first index and a second index, such that each group of non-zero matrix elements characterized by a common value of the first index corresponds to a query-path of vertices, the query-path ending or beginning at a vertex being labeled by the common value of the first index.

According to still further features in the described preferred embodiments the objective function is calculated as a sum of weights of vertices corresponding to a respective group of the non-zero matrix elements.

According to a further aspect of the present invention there is provided a method of optimizing a plurality of sets of assignments respectively characterized by a plurality of objective functions, each set of the plurality of sets being associated with an agent and defined by at least one assignment performable by the agent. The method comprises, for each assignment being identified as an element of more than one set: (a) using a respective portion of the plurality of objective functions for determining a relative weight of each set containing the assignment as compared to an overall weight of other sets containing the assignment; and (b) if the relative weight satisfies a predetermined rejection criterion then excluding the assignment from the set; thereby optimizing the plurality of sets of assignments.

According to further features in preferred embodiments of the invention described below, the method further comprises, applying at least one global optimization process to the plurality of sets so as to obtain at least one non-local optimum of the plurality of sets.

According to still further features in the described preferred embodiments the method further comprises repeating steps (a) and (b) using a different rejection criterion.

According to still further features in the described preferred embodiments the method further comprises repeating the steps (a) and (b) a plurality of times, each time using a different rejection criterion.

According to still further features in the described preferred embodiments the determining the relative weight comprises calculating a loss in a total objective function, the loss corresponding to exclusion of the set containing the assignment from the other sets containing the assignment.

According to still further features in the described preferred embodiments the calculating the loss comprises, summing objective functions over the other sets containing the assignment thereby providing a first sum, summing reduced objective functions over the other sets containing the assignment thereby providing a second sum, and subtracting the second sum from the first sum.

According to still further features in the described preferred embodiments the method further comprises assigning a set of assignments to each agent thereby associating the set with the agent. According to still further features in the described preferred embodiments the assigning of the set of assignments is by constructing a graph and using a longest-path algorithm for obtaining a path over the graph.

According to yet another aspect of the present invention there is provided an apparatus for assigning sets of assignments to at least one agent. The apparatus comprising: a graph constructor, for constructing, for each agent, a graph having a plurality of vertices and a plurality of edges, wherein each vertex of the plurality of vertices represents an assignment performable by the agent while being at a respective state, and each edge connects two vertices hence represents a transition between two states. The apparatus further comprises a weight assigner, for assigning a predetermined weight for each vertex; and a path optimizer, supplemented by a longest-path algorithm and configured to obtain a path over the graph, wherein the path comprises a plurality of connected vertices and being characterized by a substantial optimal objective function defined using respective weights of the plurality of connected vertices.

According to still another aspect of the present invention there is provided an apparatus for assigning sets of assignments to at least one satellite. The apparatus comprising: a trajectory determinator, for determining, for each satellite, a trajectory of the satellite; a graph constructor, for constructing a graph having a plurality of vertices and a plurality of edges, wherein each vertex represents an assignment performable by the satellite while being located at a location along the trajectory, and each edge connects two vertices, hence represents a propagation of the satellite between two locations along the trajectory. The apparatus further comprises a weight assigner, for assigning a predetermined weight for each vertex of the plurality of vertices; and a path optimizer, supplemented by a longest-path algorithm and configured to obtain a path over the graph, the path having a plurality of connected vertices and being characterized by a substantial optimal objective function defined using respective weights of the plurality of connected vertices.

According to further features in preferred embodiments of the invention described below, the apparatus further comprises a time window definer, communicating with the trajectory determinator and configured to define, for each assignment, a time window at which the assignment is performable by the satellite.

According to still further features in the described preferred embodiments the apparatus further comprises a discretizer, for discretizing each time window thereby obtaining a plurality of time instants, respectively corresponding to a plurality of locations of the satellite along the trajectory.

According to still further features in the described preferred embodiments the apparatus further comprises a subdividing unit for subdividing at least one assignment of the plurality of assignment into a plurality of sub-assignments.

According to still further features in the described preferred embodiments the apparatus further comprises a collection definer for defining at least one collection of assignments having at least two assignments, the at least two assignments being performable by the agent while being at a single state of the plurality of states.

According to still further features in the described preferred embodiments the apparatus further comprises a testing unit capable of performing an accumulated resources test.

According to still further features in the described preferred embodiments the apparatus further comprises a graph reducing unit, for reducing a size of the graph.

According to still further features in the described preferred embodiments the apparatus further comprises an output unit for outputting a list of query-paths and corresponding objective functions.

According to still a further aspect of the present invention there is provided an apparatus for optimizing a plurality of sets of assignments respectively characterized by a plurality of objective functions, each set of the plurality of sets being associated with an agent and defined by at least one assignment performable by the agent, the apparatus comprising: a shared assignments identifier, for identifying shared assignments, the shared assignments being identified as elements of more than one set; a relative weight determinator for using a respective portion of the plurality of objective functions to determine a relative weight of each set containing a shared assignment as compared to an overall weight of other sets containing the shared assignment; and a conditional excluder for excluding the assignment from the set if the relative weight satisfies a predetermined rejection criterion.

According to further features in preferred embodiments of the invention described below, the apparatus further comprises, a global optimization unit for applying at least one global optimization process to the plurality of sets so as to obtain at least one non-local optimum of the plurality of sets.

According to still further features in the described preferred embodiments the relative weight determinator is operable to calculate a loss in a total objective function, the loss corresponding to exclusion of the set containing the assignment from the other sets containing the assignment.

According to still further features in the described preferred embodiments the relative weight determinator comprises: a summing unit for summing objective functions over the other sets containing the assignment thereby to provide a first sum, and summing reduced objective functions over the other sets containing the assignment thereby to provide a second sum; and a subtraction unit for subtracting the second sum from the first sum.

According to still further features in the described preferred embodiments the reduced objective functions are calculated by excluding a contribution of the assignment from each objective function of the other sets containing the assignment.

According to still further features in the described preferred embodiments the predetermined rejection criterion is selected so as to minimize the loss.

According to still further features in the described preferred embodiments the at least one global optimization process comprises a stochastic process.

According to still further features in the described preferred embodiments the stochastic process is selected from the group consisting of simulated annealing, tabu search, genetic algorithm, stochastic neural network process and any combination thereof.

According to still further features in the described preferred embodiments the at least one global optimization process comprises a deterministic process.

According to still further features in the described preferred embodiments the deterministic process is selected from the group consisting of a deterministic neural network process and a gradient search process.

According to still further features in the described preferred embodiments the apparatus further comprises, an assigning unit for assigning a set of assignments for each agent, thereby to associate the set with the agent. According to still further features in the described preferred embodiments the assigning unit comprises: a graph constructor, a weight assigner and a path optimizer, as further detailed hereinabove.

According to an additional aspect of the present invention there is provided a satellite managing system. The system comprises: an assignment managing apparatus, for assigning sets of assignments to at least one satellite, and a communication emit, for transmitting the assignments to the at least one satellite and receiving information from the at least one satellite. The assignment managing apparatus comprises: a trajectory determinator, for determining, for each satellite, a trajectory of the satellite; a graph constructor, for constructing a graph having a plurality of vertices and a plurality of edges, wherein each vertex represents an assignment performable by the satellite while being located at a location along the trajectory, and each edge connects two vertices of the plurality of vertices, hence represents a propagation of the satellite between two locations along the trajectory. The assignment managing apparatus further comprises a weight assigner, for assigning a predetermined weight for each vertex; and a path optimizer, supplemented by a longest-path algorithm and configured to obtain a path over the graph, the path having a plurality of connected vertices and being characterized by a substantial optimal objective function defined using respective weights of the plurality of connected vertices.

According to further features in preferred embodiments of the invention described below, the assignment managing apparatus further comprises a time window definer, communicating with the trajectory determinator and configured to define, for each assignment, a time window at which the assignment is performable by the satellite.

According to still further features in the described preferred embodiments the assignment managing apparatus further comprises a discretizer, for discretizing each time window thereby obtaining a plurality of time instants, respectively corresponding to a plurality of locations of the satellite along the trajectory.

According to still further features in the described preferred embodiments the graph constructor is configured to define additional vertices of the graph in a manner such that each vertex of the graph represent a different combination of time instant and orientation of the satellite.

According to still further features in the described preferred embodiments the assignment managing apparatus further comprises a graph reducing unit, for reducing a size of the graph.

According to still further features in the described preferred embodiments the assignment managing apparatus further comprises an output unit for outputting a list of query-paths and corresponding objective functions.

According to still further features in the described preferred embodiments the graph reducing unit is capable of performing at least one reduction procedure selected from the group consisting of triangular inequality reduction and inferior edge elimination.

According to still further features in the described preferred embodiments the graph reducing unit is capable of alternating between the triangular inequality reduction and the inferior edge elimination in an iterative fashion.

According to still further features in the described preferred embodiments the path optimizer comprises: a query-path unit for defining and storing a set of query-paths; an objective function calculator for calculating, for each query-path of the set of query-paths, an objective function; and an updating unit, for dynamically updating the set of query-paths using the objective function.

According to still further features in the described preferred embodiments the query-path unit comprises a matrix constructor, for constructing a square matrix having a first index and a second index, such that each group of non-zero matrix elements characterized by a common value of the first index corresponds to a query-path of vertices, the query-path ending or beginning at a vertex being labeled by the common value of the first index.

According to still further features in the described preferred embodiments each non-zero matrix element of the square matrix represents a weight assigned to a vertex labeled by a value of the second index.

The present invention successfully addresses the shortcomings of the presently known configurations by providing a method and apparatus for distributing sets of assignments to a plurality of agents, which enjoy properties far exceeding prior art.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 3b-c is a schematic illustration of an inferior edge elimination procedure, according to a preferred embodiment of the present invention;

DESCRIPTION OF THE PREFERRED EMBODIMENTS

Figure 1:
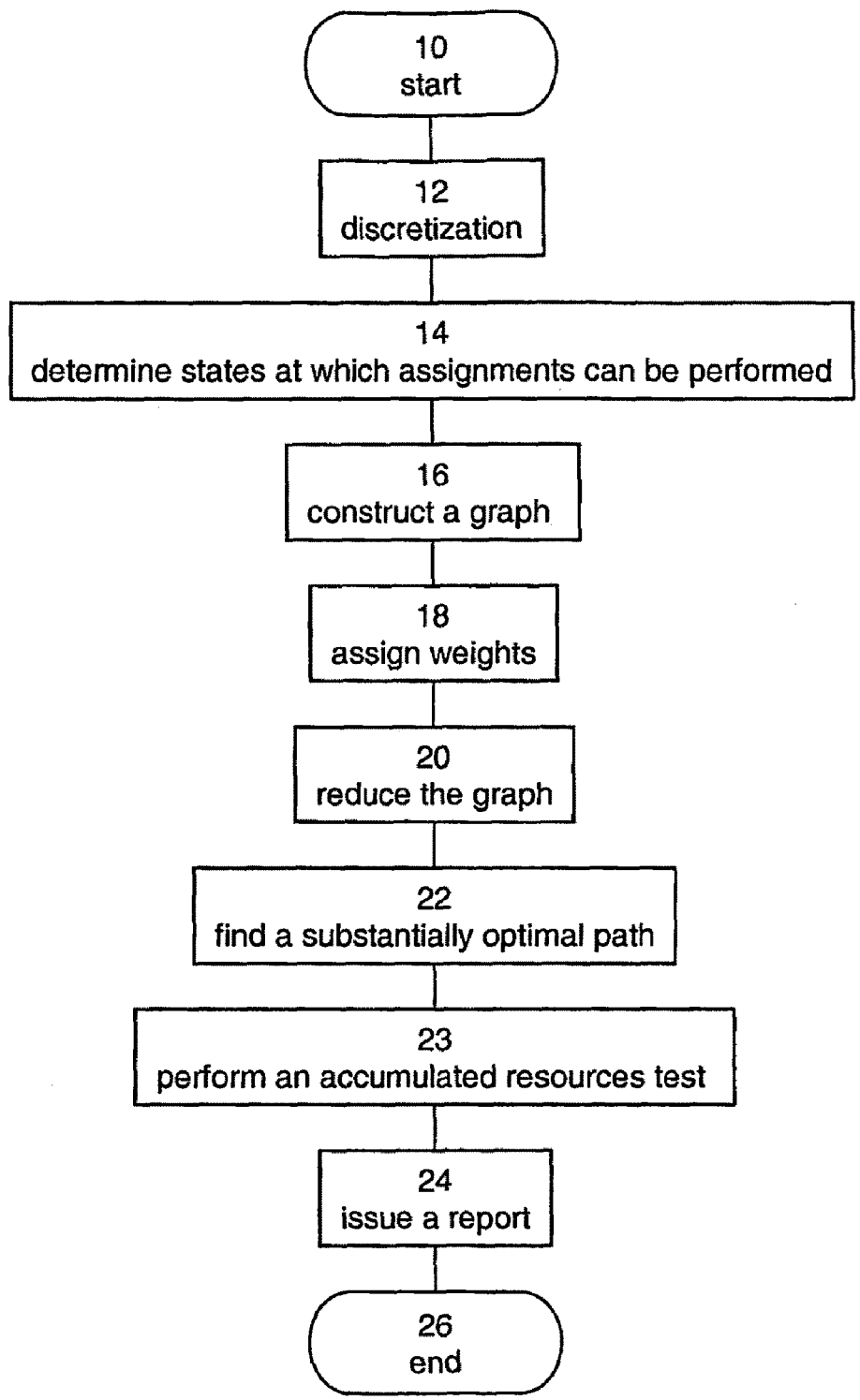
FIG. 1 is a flowchart diagram of a method of assigning sets of assignments to at least one agent, according to a preferred embodiment of the present invention.

The present invention is of a method, apparatus and system for distributing sets of assignments to at least one agent, which can be, for example, a satellite. Generally, the present invention can be used for scheduling assignments into a set of opportunities. Specifically, the present invention can be used to instruct an orbiting satellite to capture images while being located at different locations of its trajectory.

The principles and operation of a method apparatus and system according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided a method of assigning sets of assignments to at least one agent capable of assuming a plurality of states. The method can be tangibly embodied by a machine-readable memory having a program of instructions executable by the machine for executing the method. The agent is preferably a moving agent, such as, but not limited to, an orbiting satellite, an aircraft, a moving sensor or any other vehicle. The agent can also be a reading head floating over a surface of a memory medium, such as, but not limited to, a magnetic hard disk or a compact disk.

While the embodiments below are described with a particular emphasis to orbiting satellites, it is to be understood that more detailed reference to orbiting satellite is not to be interpreted as limiting the scope of the invention in any way.

The states of the agent can be associated with many properties, including, without limitation: location, orientation, operation mode and a particular configuration of the agent at different time instants. For example, a first state can represent the location of the agent at time $t_1$, a second state can represent its orientation at time $t_1$, a third state can represent the location of the agent at time $t_2$, etc.

The agent can be assigned with one or more sets of assignments, where each set can be defined by the one or more assignments. The assignments of the agents can be of any type, including, without limitation image capturing, broadcasting, loading or unloading of objects, reading data from memory and the like. In any event each assignment is preferably characterized by one or more parameters reflecting the type of the assignment and any other information if desired. For example, when the assignments comprise the capturing of images, each assignment can be characterized by the location of the imaged scene, the size of the image or the scene, the envelope shape, resolution and/or quality of the image, the priority and the like. Additionally, the assignment can be characterized by the required type of acquisition (e.g., mono, stereo). Another parameter or set of parameters which is preferably used for characterizing the assignment represents the importance and/or urgency of the assignment. This parameter is referred to hereinafter as the weight of the assignment.

According to a preferred embodiment of the present invention, the states are defined in accordance with the nature of the assignments which are to be assigned to the agent. In particular, states which are not relevant to the nature of the assignments are preferably not used. Such not used states may include, without limitation: (i) states which inhibit the agent from performing assignments, e.g., a location at which the agent can not perform any assignment; and (ii) states which have no or week correlation with the assignment's nature, e.g., an operation mode which does not interfere with the assignment.

One ordinarily skilled in the art would appreciate that although the number of states of a single agent can be infinite, they can be discretized in a manner such as to allow their processing at finite computation time. Specifically, states which relate to a location of the agent can be discretized by performing time axis discretization and identifying a location of the agent at a particular time instant as a discrete state.

The states of the agent or a portion thereof can be an inputted to the method prior to its execution or can be determined during execution, preferably, but not obligatory, at a first execution step. For example, when the agent is a satellite, states which are related to its orientation or operation mode can be inputted while states which are related to its location can be determined during execution, by trajectory analysis.

Referring now to the drawings, FIG. 1 is a flowchart of the method according to various exemplary embodiments of the present invention. It is to be understood that, unless otherwise defined, the method steps described hereinbelow can be executed either contemporaneously or sequentially in many combinations or orders of execution. Specifically, the ordering of the flowchart of FIG. 1 is not to be considered as limiting. For example, two or more method steps, appearing in the following description or in the flowchart of FIG. 1 in a particular order, can be executed in a different order (e.g., a reverse order) or substantially contemporaneously.

Hence, the method begins at step 10 and, optionally and preferably, continues to process step 12 in which the aforementioned discretization is performed. The discretization can be performed to each and any continuous quantity associated with the agent or the assignments, including, without limitation time, translation, rotation and the like. Preferably, uniform time-discretization is employed, whereby the time axis is divided into equally-spaced time instants. Alternatively, the time discretization can be performed in accordance with a predetermined distribution function. Also contemplated are: location discretization, orientation discretization and the like. Generally, the discretization scheme and the discretized quantities are selected so as to minimize execution time, computation load and/or memory usage, during the execution of the method.

According to a preferred embodiment of the present invention the method continue to process step 14 in which, for each of the assignments, the method determines the states in which the assignment can be performed by the agent. For example, in one embodiment the method calculates for each assignment a time window at which the agent can perform the assignment. Each such time window is identified with one or more states. For example, when the agent is a satellite and a particular assignment includes imaging of a particular area on the ground, the time window can correspond to a section of the satellite's trajectory from which the area is visible to the agent.

It is appreciated that there are situations that there is no one-to-one relationship between the set of all the assignments and the set of all the states. Some assignments can not be performed while the agent is at a single state, and some states are suitable for performing more than one assignment. A representative example is the size of a target to be imaged which is larger that the area viewable by the satellite during a single swap, a representative example for the latter is a state of the satellite (position and orientation) in which more than one target can be imaged.

The present embodiments successfully address the above problem.

Figure 2A:
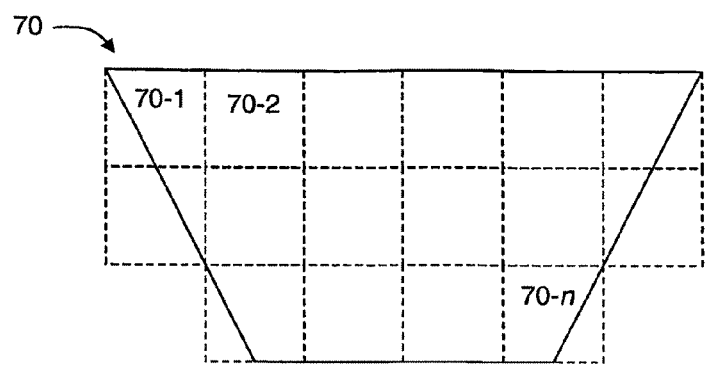
FIG. 2a schematically illustrates a subdivision of a parent assignment into a plurality of sub-assignments, according to a preferred embodiment of the present invention.

According to a preferred embodiment of the present invention, assignments which can not be performed while the agent is at a single state are subdivided into a plurality of sub-assignment. The sub-assignments are preferably selected in accordance with the capability of the agent to perform the sub-assignments, such that each sub-assignment can be performed by the agent while being at a single state and the combination of the sub-assignment forms the original assignment which was subdivided (hereinafter "the parent assignment"). This embodiment is illustrated in FIG. 2a showing a parent assignment 70 which is subdivided into n sub-assignments 70-1, 70-2, . . . , 70-n. In applications in which parent assignment 70 represents an image of a specific target, sub-assignments 70-1, 70-2, ..., 70-n can represent sub-regions of the target's area.

Figure 2B:
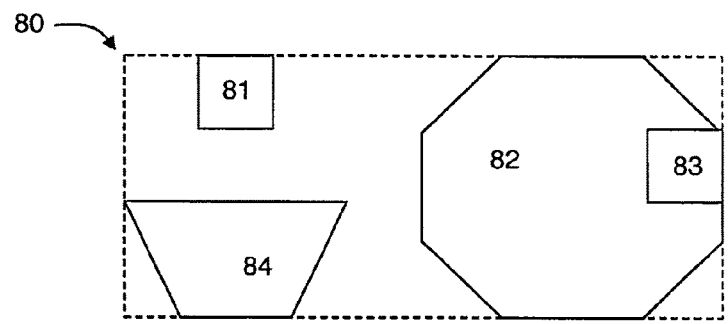
FIGS. 2b-c schematically illustrate definitions of assignment collections, according to a preferred embodiment of the present invention.
Figure 2C:
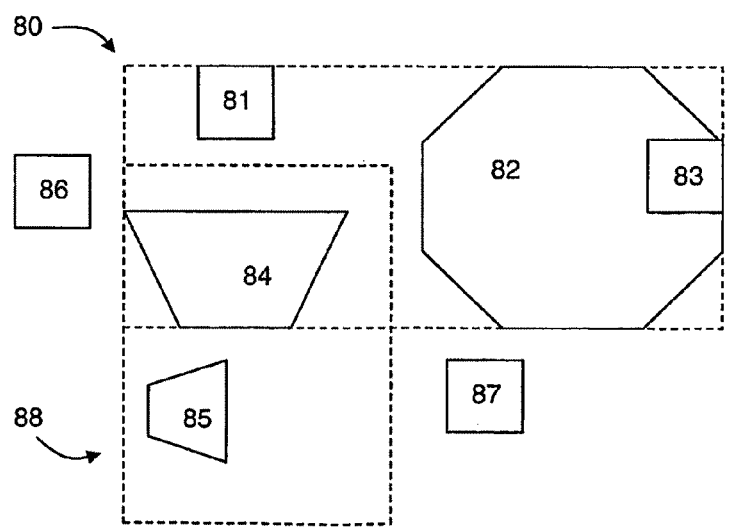

Assignments which can be performed while the agent is in more than one state are preferably collected into collections of assignments in a manner such that each collection corresponds to a suitable state for performing all the assignments in the collection. This embodiment is exemplified in FIGS. 2*b-c* showing a collection 80 of four assignments designated by numerals 81, 82, 83 and 84. The members of the collection can be, for example, neighboring or overlapping targets to be imaged. It is to be understood that there can be more than one collection and each collection can have any number of assignments. A collection of assignments is preferably treated by the method as an assignment. Additionally, according to a preferred embodiment of the present invention the collections are added to the set of assignments without excluding the members of the collection from the original set. For example, suppose that the set of assignment includes seven assignments (designated in FIG. 2*c* by numerals 81 to 87), four of the assignments (81 to 84) are collected into collection 80, and two of the assignments (84 and 85) are collected into collection 88. According to the presently preferred embodiment of the invention the set of assignments is now redefined to have nine assignments (80-88) the original seven assignments and two additional assignments which are defined as collections of assignments. As can be understood, from the present example, some assignments, can be members of more than one collection (assignment 84 in FIG. 2*c* is a member in collections 80 and 88). As further detailed hereinbelow, although some assignments appear more than one time in the redefined set, the method can treat the set and assigns the assignments to the agent without performing an assignment more than once.

Referring again to FIG. 1, the method continues to process step 16 in which a graph is constructed. The graph comprises a plurality of vertices where each vertex represents an assignment performable by the agent while being at a respective state. In cases in which the same assignment is associated with more than one state, a different vertex is generated for each such state. Thus, for example, a particular location along the agent's trajectory can be represented in two or more vertices, where each such vertex corresponds to a different orientation of the agent. Additionally, in cases in which sub-assignments were defined, a different vertex is preferably generated for each such sub-assignment, and in cases in which the set of assignment was redefined to include collections of assignments, a different vertex is preferably generated for each such collection. Preferably but not obligatorily, parent assignments are not represented by vertices, because such assignments, as stated, can not be performed while the agent is in a single state.

According to a preferred embodiment of the present invention the graph further comprises a plurality of edges, preferably directed edges, where each edge connects two vertices, hence represents a transition between two states of the agent. For example, an edge connecting two vertices corresponding to two different locations represents propagation of the agent between the two locations. According to various exemplary embodiments of the present invention, the edges connect all the vertices between which a transition is possible or allowed. Conversely, in situation is which a transition between states is not possible or not allowed, the corresponding vertices remain unconnected. Thus, when it is desired not to allow the agent to perform an assignment more than once, all vertices corresponding to a particular assignment (and different states) remain disconnected. According to a preferred embodiment of the present invention, vertices representing collections of assignments are not connected to vertices representing respective individual members of the collections. In the example shown in FIG. 2*c*, the vertex representing collection 80 is not connected to the vertices representing individual assignments 81-84, and the vertex representing collection 88 is not connected the vertices representing individual assignments 84 and 85. As will be appreciated by one of ordinary skill in the art the lack of connecting edges between collections and their individual members ensures that no assignment is performed more than once. Collections sharing one or more assignments can be connected or not, as desired, depending on the importance of the members of the collections.

As will be appreciated by one of ordinary skill in the art, the resulting graph describes all possible combinations between assignments and states of the agent, and all the allowed transitions between states in which an assignment is to be performed by the agent.

Once the graph is constructed, the method preferably continues to process step 18 in which a predetermined weight is assigned to each vertex of the graph. The weight of the vertex preferably quantifies criteria attributed to the respective assignment. For example, the weight of the vertex can be a quantified representation of the importance and/or the urgency of the assignment. Additionally, the weight of the vertex can quantify one or more constraints, such as, but not limited to, the difficulty to perform the respective assignment (e.g., due to meteorological conditions), the remaining opportunities to perform the assignment or the expected successes of the assignment (e.g., expected quality of an image to be captured by the agent). According to a preferred embodiment of the present invention each vertex representing a sub-assignment is assigned with the relative weight of the respective sub-assignment. The relative weight can be, for example, the weight of the parent assignment divided by the number of sub-assignment to which it was sub-divided normalized by the sub-assignment portion in the assignment (e.g. area). Each vertex representing a collection of assignments is preferably assigned with the accumulated weight of the individual members of the collection. accumulated weight can be, for example, the sum of weights of the individual members of the collection.

As further detailed hereinbelow, the weights are used for defining an objective function characterizing paths on the graph. Typically, the weights are defined such that more favored paths on the graph have larger values of the objective function then less favored paths. However, this need not necessarily be the case, since, for some applications, it may be more convenient to assign smaller values of the objective function for more favored paths and larger values of objective function for less favored path. Thus, the weights can be defined either in a "positive" manner in which case larger weight correspond to a higher score of the respective vertex or a "negative" manner in which case larger weight correspond to a lower score of the respective vertex.

According to various exemplary embodiments of the present invention the method continues to process step 20 in which the graph is reduced. The process of graph reduction can include any reduction procedure known in the art, including, without limitation triangular inequality reduction and inferior edge elimination.

Figure 3A:
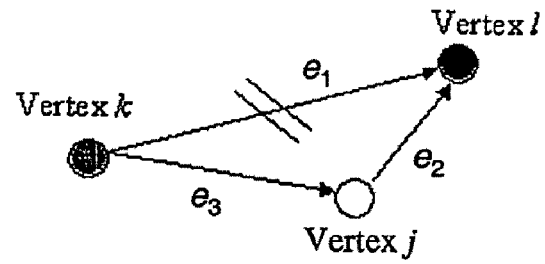
FIG. 3a is a schematic illustration of a triangular inequality reduction procedure, according to a preferred embodiment of the present invention.
Figure 3A:
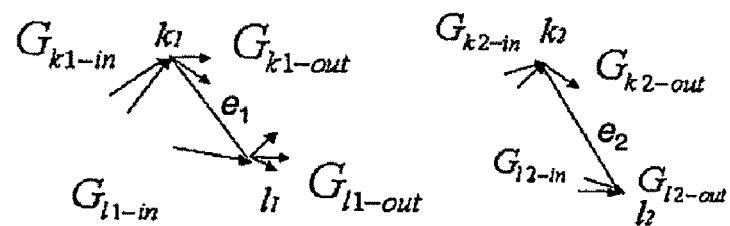

Reference is now made to FIGS. 3*a-c*, which schematically illustrate the triangular inequality reduction (FIG. 3*a*) and the inferior edge elimination (FIGS. 3*b-c*). Generally, the triangular inequality reduction is a procedure in which an edge between two vertices is eliminated whenever these vertices are connected indirectly through one or more additional vertex. Referring to FIG. 3a, vertices k and l are directly connected by edge $e_1$, and indirectly connected by edges $e_2$ and $e_3$ through vertex j. According to the triangular inequality reduction procedure, edge $e_1$ is eliminated such that a single path, k→$e_3$→j→$e_2$→l connects vertices k and l.

In the inferior edge elimination procedure edges that are inferior to other edges are eliminated. Inferiority is preferably quantified in terms of the accumulated weight along the path formed by the edges. FIGS. 3b-c illustrate two configurations on the graph in which a pair of assignments denoted k and l, are represented by two pairs of vertices. Specifically, FIG. 3b shows edge $e_1$ connecting vertices $k_1$ and $l_1$, and FIG. 3c shows edge $e_2$ connecting vertices $k_2$ and $l_2$, where vertices $k_1$ and $k_2$ correspond to assignment k and vertices $l_1$ and $l_2$ correspond to assignment l. Also shown in FIGS. 3b-c are groups of incoming and outgoing edges to each of the vertices $k_1, k_2, l_1$ and $l_2$, respectively denoted by $G_{k1-in}, G_{k1-out}, G_{k2-in}, G_{k2-out}, G_{l1-in}, G_{l1-out}, G_{l2-in}, G_{l2-out}$. As will be appreciated by one of ordinary skill in the art, $G_{l2-out}$ is a subset of $G_{l1-out}$, and $G_{k1-in}$ is a subset of $G_{k2-in}$ provided the time-ordering is such that vertex $l_2$ corresponds to a later time than vertex $l_1$.

According to the inferior edge elimination procedure if, for the same time-ordering, $G_{l2-in}$ is a subset of $G_{l1-in}$ and $G_{k1-out}$ is a subset of $G_{k2-out}$, then edge $e_2$ is inferior to edge $e_1$ and can be eliminated.

According to various exemplary embodiments of the present invention the reduction step is iteratively repeated, e.g., until the size of the graph (the number of the edges) is significantly reduced. This can be done, for example, by alternating between the triangular inequality reduction and the inferior edge elimination. Preferably, the reduction procedures are repeated until there are no more edges which can be eliminated.

Referring again to FIG. 1, according to a preferred embodiment of the present invention the method continues to process step 22 in which a longest-path algorithm is employed for obtaining a path of connected vertices. The path is preferably characterized by a substantial optimal objective function, which can be defined using the respective weights along the path. Representative examples for the definition of the objective function include, without limitation, a sum of the weights, a stun of square of the weights, a sum of the reciprocal values of the weights, a reciprocal value of the sum of the weights, a negation of the sum of the weights and the like.

As used herein, "substantial optimal objective function" refers to a close-to-highest or close-to-lowest value of the objective function, depending on the definition of the weights or the objective function. Specifically, the definition of the weights or the objective function are such that it is desired to maximize the objective function, the term "substantial optimal objective function" refers to a value of the objective function which is slightly smaller or equals its maximal value; conversely, when the definition of the weights or the objective function are such that it is desired to minimize the objective function, the term "substantial optimal objective function" refers to a value of the objective function which is slightly larger or equals its minimal value.

As used herein "substantial optimal path" referees to a path of connected vertices characterized be a substantial optimal objective function.

The obtained path preferably represents the assignments for the agent, where each vertex represents an assignment to be performed thereby. Any longest-path algorithm can be used, see, e.g., T. Cormen, C. E. Leiserson, R. L. Rivest and C. Stein, "Introduction to algorithms", McGraw-hill, 2001, pages 966, 978, 1017. A representative example of a longest-path algorithm is provided hereinunder.

Once an optimal or substantially optimal path is found on the graph, the method preferably continues to process step 24 in which a report is issued. The report can comprise, for example, a list of paths and corresponding objective functions, so as to allow the user to select the preferred path, according to the value of its objective function. Typically, the desired path is the one with the highest score, i.e., the path having the highest value of objective function. Oftentimes, however, due to certain constraints or preferences, the user may select paths having smaller values of the objective function.

In an optional and preferred step, designated in FIG. 1 by numeral 23, the method performs an "accumulated resources test" in which a quantity representing the accumulated resources required for performing all the assignments is calculated for one or more of the paths. This quantity is preferably compared with the capacity limit (e.g., onboard recorder limit, thermal dissipation limit, etc.) of the agent. According to a preferred embodiment of the present invention paths which exceed one or more of the capacity limits of the agent are rejected.

Step 23 can be performed once step 22 is completed or contemporaneously therewith. Hence, in one embodiment, step 23 is performed on all the paths in the aforementioned list of paths, such that paths which are optimal with respect to the objective function, but fail to obey the accumulated resources test is removed from the list or being scored with a lower score.

In another embodiment, step 23 is performed during the iterations of the longest-path algorithm, such that the accumulated resources test is performed dynamically while traversing the graph in the search for the longest-path. As will be appreciated by one ordinarily skilled in the art, the application of the accumulated resources test during the longest-path algorithm can break the Markovian nature of the longest-path algorithm.

According to a preferred embodiment of the present invention the report generated in step 24 is constructed so as to allow distribution of the assignment for different levels, including, without limitation, annual, monthly, weekly and daily levels. Additionally, the report preferably comprises, for each agent, collection of activity windows, representing the timeframe at which each assignment can be performed. Still additionally, the report preferably provides a plan to collect, record, transmit, receive and/or process the relevant information. For example, the report can have entries for time, satellite and ground station, such that the user can use the report to determine, for each assignment, to which satellite it belongs, from which ground station a request can be transmitted and at which ground station the information (e.g., image) can be received once the assignment is completed. According to a preferred embodiment of the present invention the report also provides a plan to disseminate the obtained information among other recipients, such as other ground stations, clients and the like.

The method ends in step 26.

Figure 4:
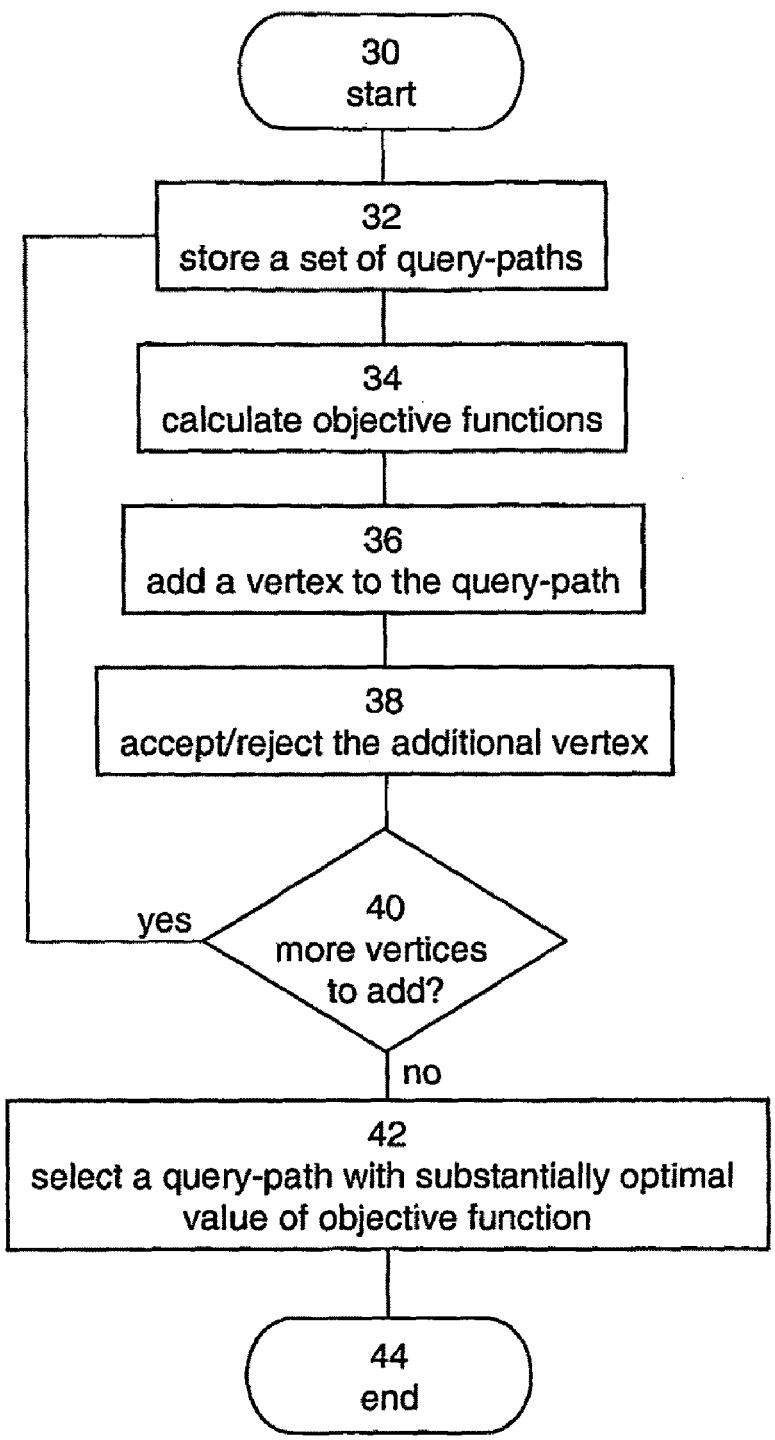
FIG. 4 is a flowchart diagram of a longest-path algorithm, according to a preferred embodiment of the present invention.

Reference is now made to FIG. 4 which is a flowchart diagram of a longest-path algorithm which can be employed, according to various exemplary embodiments of the present invention.

Hence, the algorithm begins at step 30 and continues to process step 32 in which a set of query-paths is stored. The set of query-paths has a certain initial construction (e.g., all vertices having no incoming) which is iteratively updated as further detailed hereinunder.

The set of query-paths can be stored in any mathematical form known in the art. For example, in one embodiment, the set is stored in a square matrix, R, having a first index (labeling, say, the rows of the matrix) and a second index (labeling, say, the columns of the matrix). The size of the matrix is preferably N×N where N is the number of vertices in the graph. Each entry of R thus corresponds to a connection between two vertices. For example, $R_{kj}$ corresponds to vertices k and j being connected by an edge. Thus, generally, each group of non-zero matrix elements of, say, a particular row of R, corresponds to a query-path ending or beginning at a vertex being labeled by the row's number. The following description is for the case in which the rows of R represent paths of vertices. One of ordinary skill in the art will appreciate that an equivalent description can be used for the case in which the columns of R represent paths.

According to a preferred embodiment of the present invention all the off-diagonal matrix elements and a portion of the diagonal matrix elements of R are initially set to zero. Thus, in this embodiment, the initial construction of R includes a few non-zero matrix elements on the diagonal of R, corresponding to vertices having a zero number of incoming edges. In an alternative, yet preferred, embodiment, the non-zero matrix element on the diagonal can correspond to vertices having a zero number of outgoing edges. As further detailed hereinunder, the algorithm dynamically updates R such as to include more non-zero diagonal as well as off-diagonal elements. Non-zero matrix element can have a constant value (e.g., 1) or can be assigned with weights as desired.

For simplicity the following description is for the case in which the initial set includes vertices having a zero number of incoming edges. Hence, denoting the set of query path by $G_0$, the initial construction of R is preferably:

$$R(G_0, G_0) = g(G_0) \quad \text{for } G_0 = 1, 2, \ldots, s_0; \text{ and} \quad \text{(EQ. 1)}$$
$$R = 0 \quad \text{otherwise}$$

where $s_0$ is the size of $G_0$, and $g(G_0)$ is a vector whose elements are the weights of the vertices in $G_0$.

The algorithm progresses to process step 34 in which an objective function is calculated for each query-path. The objective functions are preferably calculated, as stated, using the weights along each query-path, e.g., as a sum of weights. In the matrix formulation, this corresponds to multiplying each matrix element by its respective weight and summing over each row of R. As will be appreciated by one ordinarily skilled in the art, for the initial construction of R (Equation 1), no summation is required because each row consists of no more than one non-zero element.

The algorithm proceeds to process step 36 in which, for at least one query-path, a vertex and an edge are added to the query-path. In the matrix formulation, this correspond to adding off-diagonal elements to R. According to a preferred embodiment of the present invention the off-diagonal elements correspond to vertices which are connected via an outgoing edge to the vertices of $G_0$. Denoting the combined group ($G_0$ and the additional vertices) by $G_1$, the following construction of R is obtained:

$$R(G_1(k, j), G_0) = g(G_1(k, j)) \quad \text{for } k = 1, 2, \ldots, s_0, j = 1, 2, \ldots, s_1(k); \quad \text{(EQ. 2)}$$
$$R = 0 \quad \text{otherwise}$$
and where $s_1$ is the size of $G_1$.

The algorithm continues to step 38 in which the objective function is used for accepting or rejecting the additional vertex and edge to the query-path. For example, when it is desired to maximize the objective function, the additional vertex and edge are accepted only if such acceptance increases the value of the objective function to the respective path. Alternatively, when it is desired to minimize the objective function, the additional vertex and edge are accepted only if such acceptance decreases the value of the objective function to the respective path.

Mathematically, this step is formulated as follows (for the case in which a maximization of the objective function is employed):

$$\text{If } \sum_{q=1}^{N} R(G_1(k, j), q) < \sum_{q=1}^{N} (G_0(k, j), q) + g(G_1(k, j); \quad \text{(EQ. 3)}$$

then set $R(G_1(k, j), q) = R(G_0(k, j), q)$ for each $q = 1, 2, \ldots, n$;

and $R(G_1(k, j), G_1(k, j)) = g(G_1(k, j))$.

The algorithm then proceeds to decision step 40. If there are more potential vertices and edges on the graph which can be added to the set, the algorithm redefines the set of query path (setting $G_0 = G_1$) and returns to step 32. Conversely, if there are no more vertices which can be added to the set (if $G_1$ is the empty group), the algorithm continues to process step 42 in which the substantially optimal path is selected from the set of query-paths. In the matrix formulation step 42 correspond to the selection of a row, $p_{max}$, of R for which the sum of weights is maximal:

$$p_{max} = \text{Find}\left\{\text{MAX}_p \sum_{q=1}^{N} R_{pq}\right\}. \quad \text{(EQ. 4)}$$

In this embodiment, the optimal path is formed of the vertices corresponding to all non-zero matrix elements of the row $p_{max}$, while the objective function corresponding to the optimal path is the sum of elements of $p_{max}$. As stated, in some embodiments it may be desired to a path having less than optimal objective function. In these cases, the maximization function of Equation 4 is replaced by an appropriate function (e.g., next-to-maximal, next-to-next-to-maximal, etc.)

It was found by the Inventors of the present invention that the algorithm as described hereon above with references to Equations 1-4, is very efficient. Specifically, the complexity of the algorithm is of parabolic order or less. As will be appreciated by one ordinarily skilled in the art, the complexity can be further reduced using parallel computing, where, e.g., different graphs are processed by different machines, in which case the complexity of the algorithm can be linear.

An additional advantage of the present embodiments is that the algorithm is economical in memory resources because, during processing, only the best path is stored for each vertex, without having to store other, less favored, paths. The optimal path is then selected by comparing all vertexes and selecting the vertex having the best objective function's value. The path associated with this vertex is defined as the optimal path.

Thus, the present embodiments provide an efficient and fast procedure for distributing the assignments among the agents. As will be appreciated by one of ordinary skill in the art, the use of longest-path algorithm once the graph is constructed and reduced allows the execution of selected steps of the method independently of the parameters of the agent. Additionally, no simulator is required during the processing of the graph. A simulator (e.g., a satellite simulator) can be used, for example, for trajectory analysis prior to the construction of the graph, without affecting the complexity of the procedure. An additional advantage of the present embodiments is that additional assignments can be easily included, by adding vertices to the graph. This embodiment is particularly useful when it is desired to investigate the impact of relatively small updates to the problem.

An additional advantage of the present embodiments is the ability to distribute the assignments taking into account many constraints, including, without limitation, the assignment characteristics (priority, image resolution, coverage, etc.), stereo pair acquisition, on board recording and downloading, weather history and weather forecast, multiple ground stations, maneuverability of agent, cost effectiveness and the like.

The present embodiments also provide an automation tool to select the appropriate activity windows of the agents as well as to subdivide the assignments according to the collection of activity windows.

According to another aspect of the present invention there is provided a method of optimizing a plurality of sets of assignments. The method can be used for optimizing sets of assignments, irrespective of the method used for defining the sets or the source from which the sets where obtained. Preferably, but not obligatorily, the method is used for optimizing sets of assignments obtained by successive executions of selected steps illustrated in the flowchart of FIG. 1, each time for a different agent (or a different trajectory of the same moving agent). Alternatively the method can be used for optimizing user-defined sets of assignments, or sets of assignments obtained by methods other than the method of FIG. 1.

The method is particularly useful for optimizing a large number of sets. Specifically, the method can be used for multiple trajectory planning and/or long term planning of moving agents. For example, in the earth observation satellites managing problem, the method can be used for optimizing assignments of many satellites moving along many trajectories. Additionally, or alternatively, the method can be used for optimizing assignments over long periods of time where each satellite completes his trajectory more than one time.

The input to the method is a plurality of sets of assignments, where each assignment is characterized by an objective function. When the sets are obtained by executing the flowchart of FIG. 1 or a portion thereof, the objective functions characterizing the sets can be the substantial optimal objective functions, characterizing the path of the graph, as further detailed hereinabove.

According to a preferred embodiment of the present invention the optimization is by processing sets of assignments having a certain overlap with other sets. Overlaps are defined as assignments identified as elements of two or more sets. Such assignments are referred to hereinafter as "shared assignments". Thus, according to the presently preferred embodiment of the invention the method processes sets identified as containing shared assignments. For the sake of simplification, the description below is for a particular shared assignment, denoted $a_i$, which is identified as being an element of several sets denoted $v_1$, $V_2$ etc. The procedure is preferably repeated for more than one shared assignment, more preferably for all the shared assignments.

Figure 5:
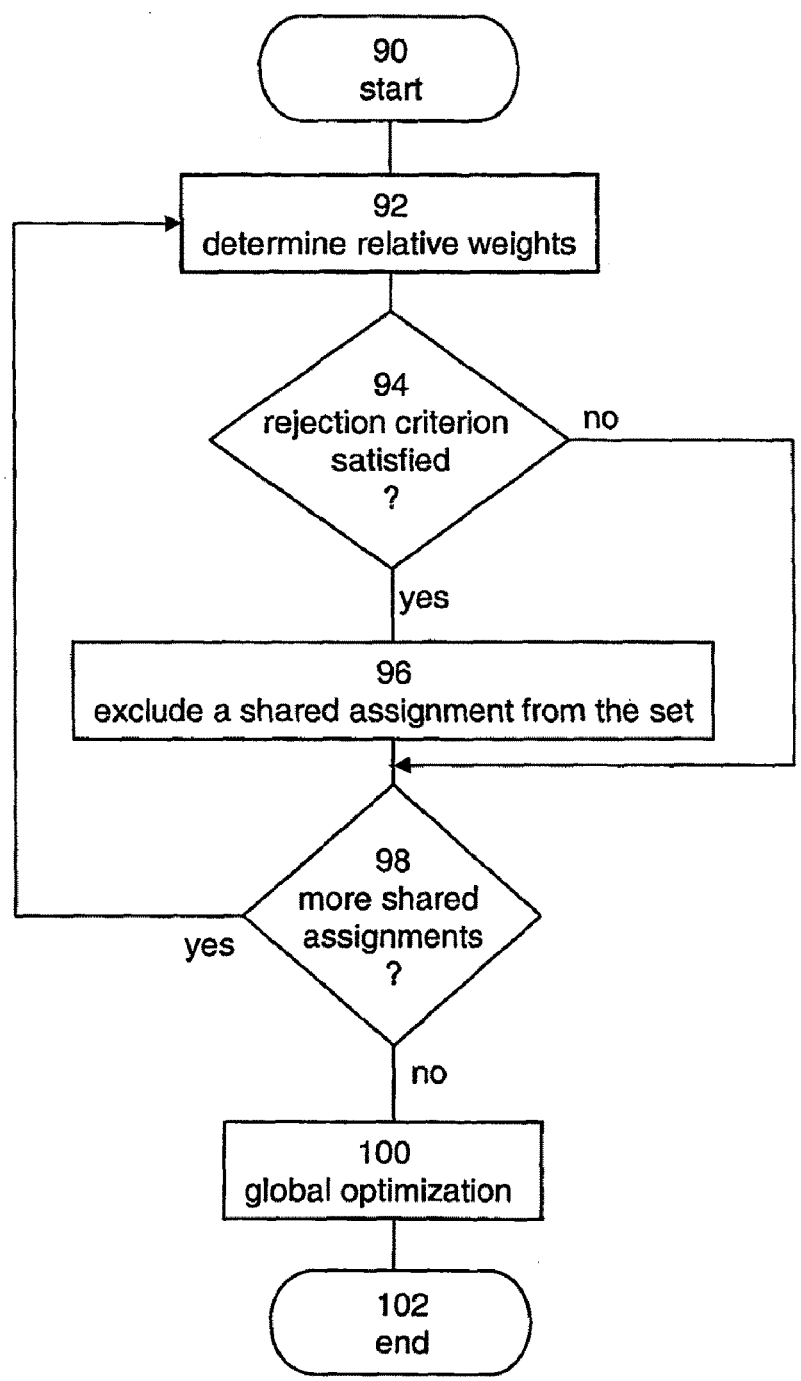
FIG. 5 is a flowchart diagram of a method of optimizing a plurality of sets of assignments, according to various exemplary embodiments of the invention.

Reference is now made to FIG. 5 which is flowchart diagram of the optimization method, according to various exemplary embodiments of the present invention.

The method begins at step 90 and continues to process step 92 in which, for each set $v_j$ (j=1, 2 ... ), a relative weight is determined as compared to an overall weight of other sets containing assignment $a_i$. The relative weight is preferably using a respective portion of the objective functions. For example, the relative weight of a set $v_k$ (containing $a_i$) can be calculated as a loss in the total objective function of the collection of sets $v_j$ (j=1, 2 ... ) due to the exclusion of $v_k$ from the collection.

The loss can be calculated, for example, by subtracting a summation of reduced objective functions over the sets $v_j$, from a summation of the objective functions over the sets $v_j$, where the reduced objective functions are defined as objective functions from which the contribution of assignment $a_i$ is excluded.

The method proceeds to conditional step 94 and determine whether or not the relative weight satisfies a predetermined rejection criterion. The rejection criterion is preferably selected so as to minimize the aforementioned objective function loss. For example, the rejection criterion can be formulated by comparing the relative weight to a predetermined threshold, and demanding that the criterion is satisfied if the relative weight is below the threshold. Conditional step 94 can be executed for all the relative weights obtained in step 92 or, more preferably, to the minimal relative weight.

If the rejection criterion is satisfied, the method continues to step 96 where the assignment $a_i$ is excluded from the set.

According to a preferred embodiment of the present invention the method continues to conditional step 98 and determines whether there are more shared assignments to process. If yes, the method loops back to step 92, if not, the method preferably continues to process step 100 in which one or more global optimization processes are applied so as to obtain at least one non-local optimum of the sets.

The method ends at step 102.

As will be appreciated by one of ordinary skill in the art, the exclusion of shared assignments performed in step 96 using the relative weights, allows the method to obtain a local optimum of the plurality of sets. The application of the global optimization process in step 100, can, for example, select the best solution from several local optima. Broadly speaking, the global optimization process traverses the space of all sets, varies parameters characterizing the sets and calculates a global score to the sets for each variation of the parameters.

Many such variations are contemplated. For example, in one preferred embodiment, the global optimization process calls steps 92, 94, 96 and 98 several times, each time with a different rejection criterion (e.g. a different threshold). In another preferred embodiment, the global optimization process switch assignments between sets. In an additional preferred embodiment, particular elements are constrained not to be excluded from particular sets, and the like.

The global optimization process can be either a stochastic or a deterministic process. Combinations between stochastic and deterministic process are also contemplated.

In the embodiment in which the global optimization process is stochastic, decisions regarding the variation of parameters and/or traversal in the space of sets are influenced by stochastic variables which are obtained from a suitable random numbers generator. Representative examples of a stochastic process include, without limitation, simulated annealing, tabu search, genetic algorithm, stochastic neural network process or any combination thereof. Such procedures are known in the art and are found, e.g., in Emile Aarts and Jan Karel Lenstra, "Local Search in Combinatorial Optimization," (1997) John Wiley & Sons.

In the embodiment in which the global optimization process is deterministic, the variations of parameters and/or traversal in the space of sets are determined according to a suitable deterministic model, such as, but not limited to, deterministic neural network gradient search and the like. Such procedures are found, e.g., in P. M. Pardalos, Mauricio G. C. Resende and Panos M. Pardalos, "Handbook of Applied Optimization," (2002) Oxford University Press.

Figure 6:
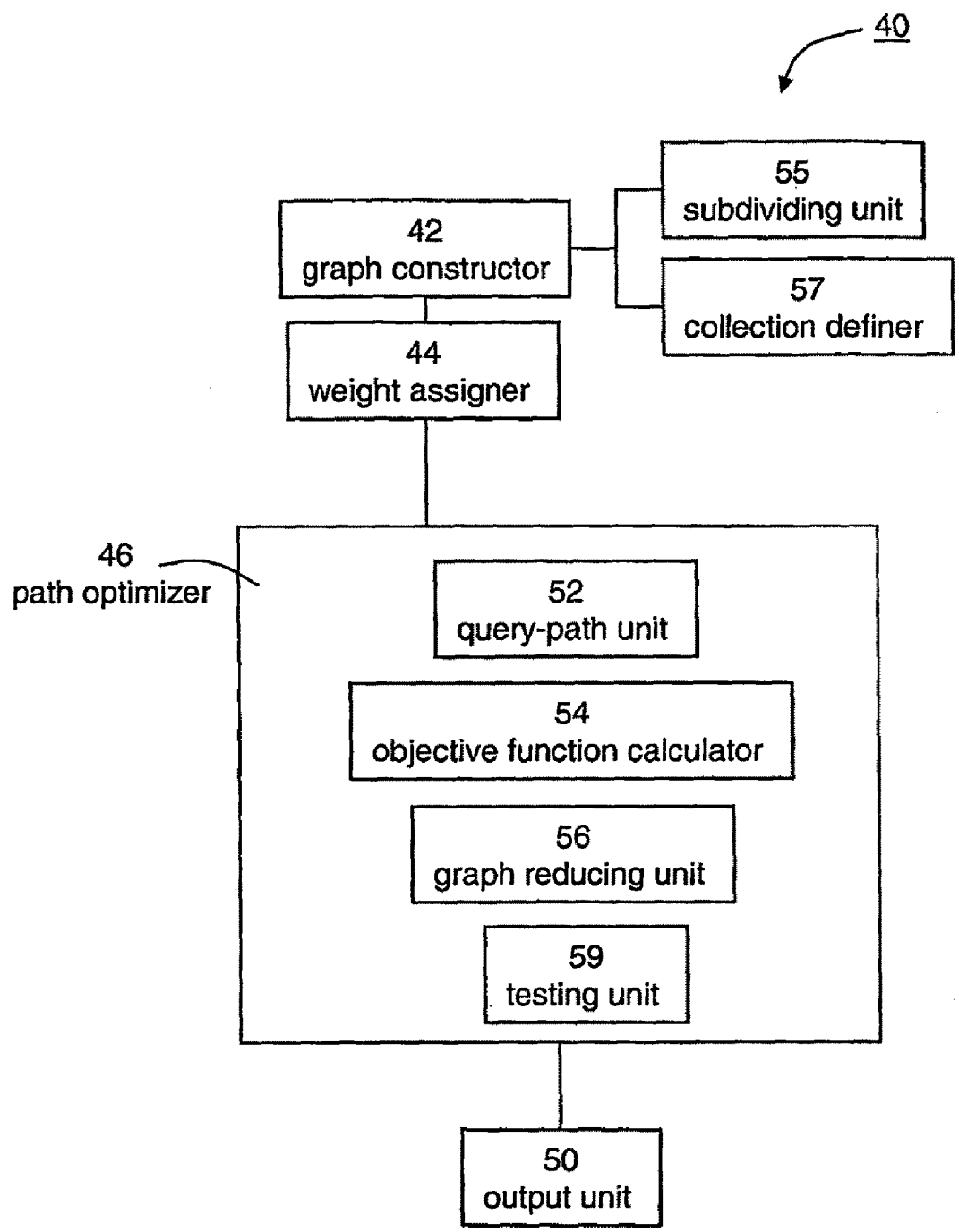
FIG. 6 is a schematic illustration of an apparatus for assigning sets of assignments to at least one agent, according to a preferred embodiment of the present invention.

Reference is now made to FIG. 6, which is a schematic illustration of an apparatus 40 for assigning sets of assignments to at least one agent, according to a preferred embodiment of the present invention. Apparatus 40 preferably comprises a graph constructor 42, for constructing a graph for each agent, as further detailed hereinabove. Optionally and preferably, graph constructor 42 communicates with a subdividing unit 55 and/or a collection definer, which respectively perform the aforementioned subdivision and collection operations, see FIGS. 2a-c and accompanying description. Apparatus 40 further comprises a weight assigner 44, for assigning weights for the vertices of the graph, as further detailed hereinabove.

Apparatus 40 further comprises a path optimizer 46 for selecting a substantial optimal path on the graph. Path optimizer 46 is preferably supplemented by a longest-path algorithm which can be tangibly embodied by a readable memory having a program of instructions executable by path optimizer 46 for executing the algorithm. Path optimizer 46 preferably comprises a query-path unit 52, for defining and storing a set of query-paths. Query-path unit 52, can comprise, for example, a matrix constructor for constructing the square matrix R, as further detailed hereinabove (see, e.g., Equations 1-4). Path optimizer 46 can further comprises an objective function calculator 54, for calculating the objective functions, an updating unit 56, for dynamically updating the set of query-paths and/or a testing unit for performing the accumulated resources test as further detailed hereinabove.

According to a preferred embodiment of the present invention apparatus 40 further comprises a graph reducing unit 48, for reducing the size of graph, e.g., using the aforementioned triangular inequality reduction and/or inferior edge elimination, and an output unit 50 for outputting a list of query-paths and corresponding objective functions.

Figure 7:
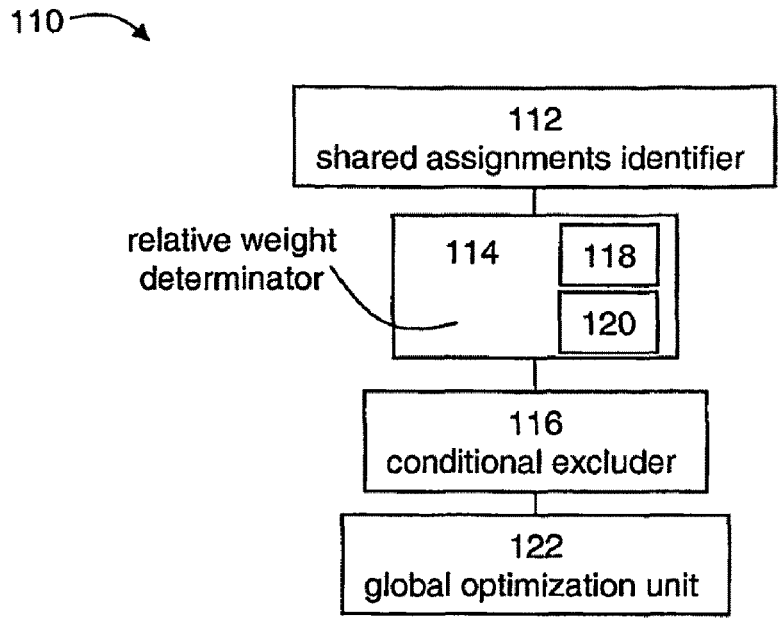
FIG. 7 is a schematic illustration of an apparatus 110 for optimizing a plurality of sets of assignments, according to various exemplary embodiments of the invention.

Reference is now made to FIG. 7, which is a schematic illustration of an apparatus 110 for optimizing a plurality of sets of assignments, according to various exemplary embodiments of the invention. Apparatus 110 can communicate with apparatus 40, in which case, apparatus 40 serves as an assigning unit which assigns a set of assignments for each agent, and apparatus 110 serves as an optimization unit which optimize the assigned sets. Alternatively, apparatus 110 can be used for optimizing sets of assignments from other assignment distribution systems. If desired, apparatus 110 can be used for optimizing user defined sets of assignments.

Apparatus 110 comprises a shared assignments identifier 112, for identifying shared assignments within the sets. As stated, shared assignments are identified as elements of more than one set. Apparatus 110 further comprises a relative weight determinator 114 for determining relative weights. Preferably, determinator 114 comprises a summing unit 118 and a subtraction unit 120 for calculating the aforementioned objective function loss. Apparatus 110 further comprises a conditional excluder 116 for excluding a shared assignment, if a respective relative weight satisfies the rejection criterion, as further detailed hereinabove.

According to a preferred embodiment of the present invention apparatus 110 comprises a global optimization unit 122 for applying one or more global optimization processes, as further detailed hereinabove.

Apparatus 40 and apparatus 110 can be used to optimize any assignment distribution problem. For example apparatus 40 and apparatus 110 can each independently be employed in a satellite management system 60.

Figure 8:
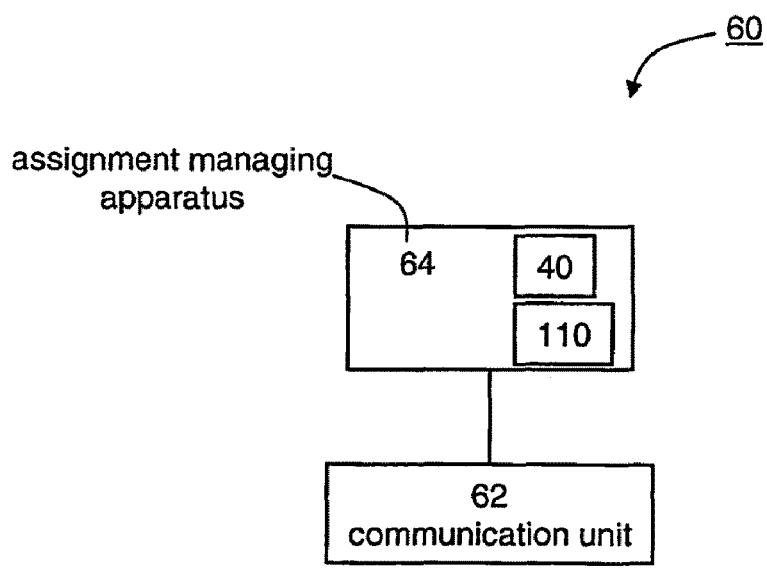
FIG. 8 is a schematic illustration of a satellite managing system, according to a preferred embodiment of the present invention.

Reference is now made to FIG. 8, which is a schematic illustration of a satellite managing system, according to a preferred embodiment of the present invention. System 60 comprises an assignment managing apparatus 64, which can comprise, for example, an assigning unit (e.g., apparatus 40) for assigning a set of assignments for each agent and, optionally and preferably, an optimization unit (e.g., apparatus 110) for further optimization as detailed hereinabove. System 60 also comprises a communication unit 62, for communicating with the satellites. According to the presently preferred embodiment of the invention, communication unit 62 transmits the assignments to the satellites and receives information therefrom. More preferably, communication unit 62 receives the list of assignments and corresponding states (e.g., location, orientation) from apparatus 64, together with location and orientation information from the satellites. Once a particular satellite is properly located and oriented, communication unit 62 transmit instruction to the satellite to carry on the respective assignment from the list of assignments received from apparatus 40.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

The method of the present embodiments has been successfully applied on a simulated problem of 30 assignments which were to be distributed among 10 satellites. Each assignment corresponded to a capture of a single image of a predetermined target on ground. The overall area-of-interest covered by all the satellites was about 1×1 km$^2$.

Figure 9:
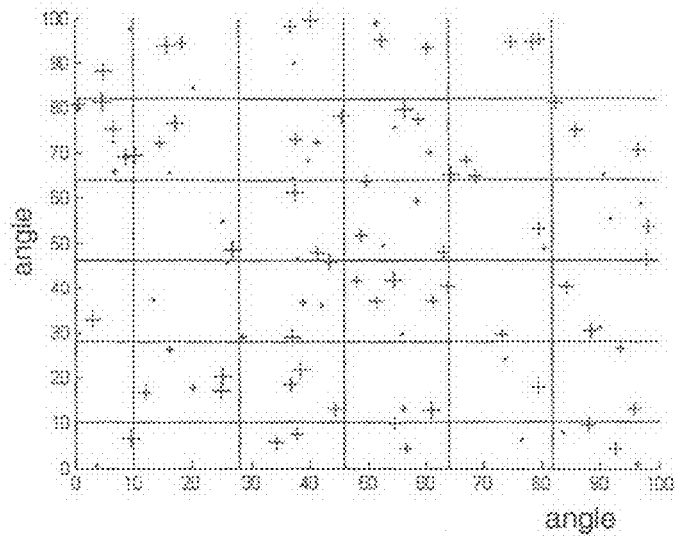
FIG. 9 is a schematic illustration of an area-of interest of a simulated problem, to which the method of the present embodiments was applied.

FIG. 9 shows the area-of interest of the simulated problem. Shown in FIG. 9 are 10 trajectories (5 vertical and 5 horizontal) denoted by straight lines, and 30 predetermined target, denoted by crosses. The size of the crosses represents the weight of each assignment, where larger crosses correspond to more important assignments. The targets positions and weights were distributed randomly over the area-of-interest. The vertical and horizontal axes of FIG. 9 represent longitudinal and transverse angles respectively.

Figure 10:
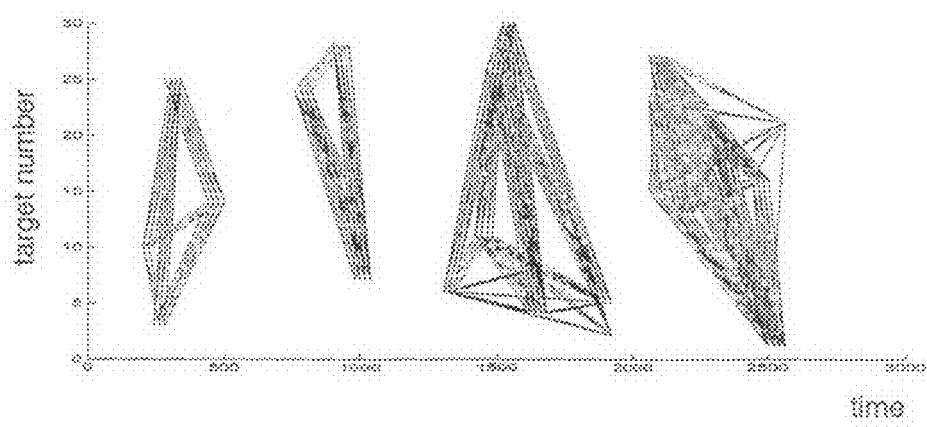
FIG. 10 shows four graphs obtained for four different trajectories of FIG. 9, according to a preferred embodiment of the present invention.

FIG. 10 shows four graphs obtained for four different trajectories of FIG. 9, after the aforementioned steps of time discretization and graph construction. Each graph shows all possible edges between vertices representing locations and orientations along the respective trajectory.

Figure 11:
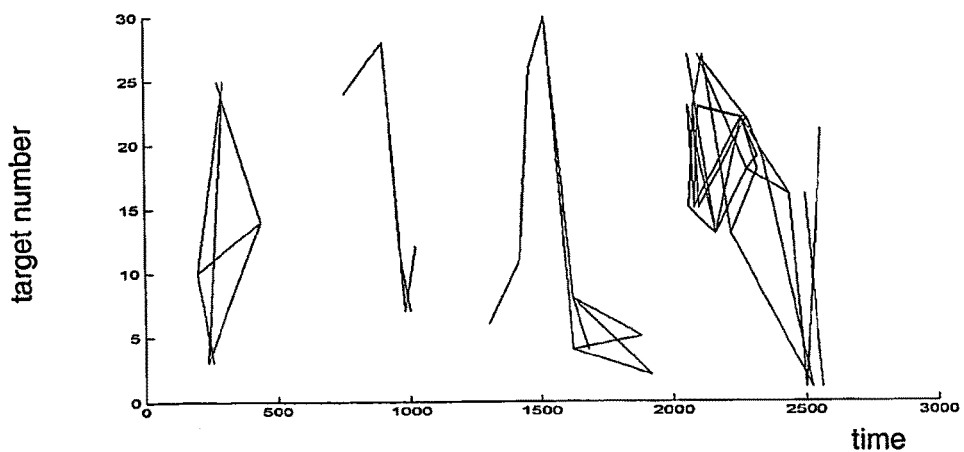
FIG. 11 shows the four graphs of FIG. 10 after an iterative reduction of each graph, using triangular inequality reduction and inferior edge elimination according to a preferred embodiment of the present invention.

FIG. 11 shows the four graphs of FIG. 10 after an iterative reduction of each graph, using triangular inequality reduction and inferior edge elimination. Vertices for which all incoming and outgoing edges were eliminated during the reduction are not displayed. As shown in FIG. 11, the reduction procedure reduces the size of the graphs by at least an order of magnitude.

Figure 12:
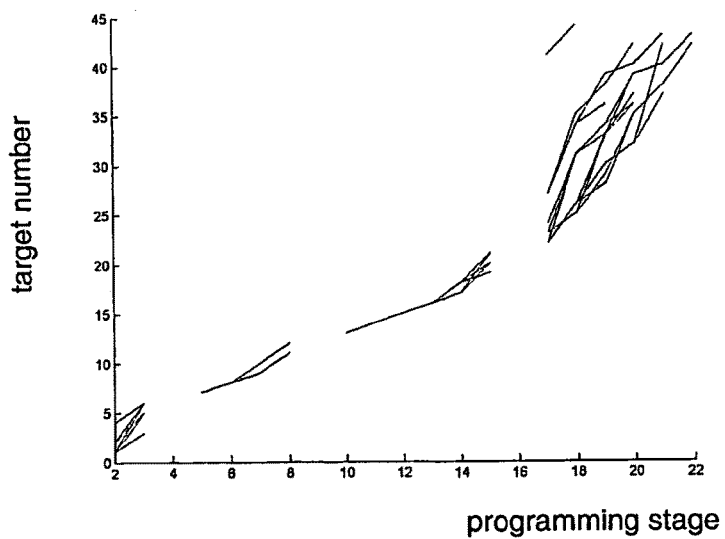
FIG. 12 is a dynamic programming tree showing query-paths of the four graphs of FIGS. 10-11, during execution of preferred embodiments of the present invention.

FIG. 12 is a dynamic programming tree showing the query-paths of the four graphs of FIGS. 10-8, during execution of the algorithm. Each query-path is represented as the target's number as a function of the programming stage, where the programming stage represents a single maneuvering sequence between two different targets.

Figure 13:
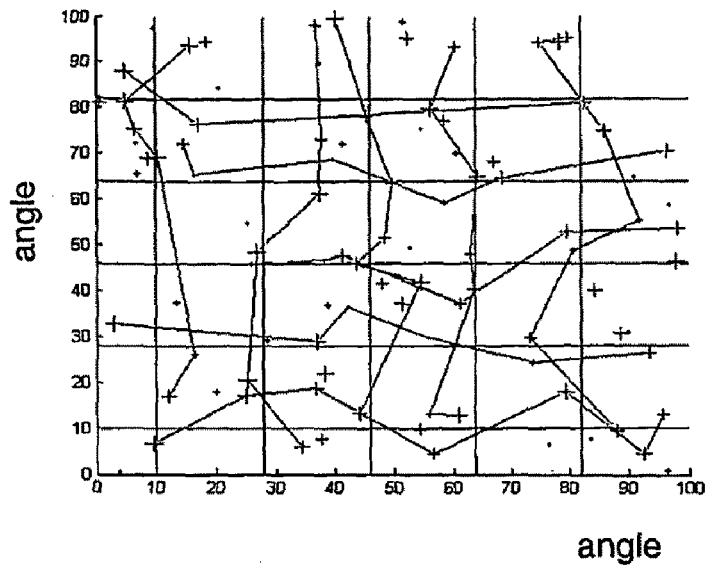
FIG. 13 shows the distributions of assignments corresponding to each of the 10 trajectories of FIG. 9, after the application of the method according to a preferred embodiment of the present invention.

FIG. 13 shows the distributions of assignments corresponding to each of the trajectories of FIG. 9. As shown in FIG. 13, assignments having larger weights are generally favored over assignments with smaller weights. Thus, the method of the present embodiments successfully distributes the assignments among the satellites.

Example 2

The optimization method of the present embodiments has been successfully applied on a simulated problem of weekly planning of 3 multiple earth observation satellites. The satellites pass through the area of interest consisting 600 randomly spread targets. During the relevant week, the 3 satellites pass through the area of interest 30 times. Thus, the 600 assignments were classified into 30 sets of assignments where each set corresponds to a single traverse of a trajectory by a single satellite.

Method

The sets were initially characterized, in accordance with various exemplary embodiments of the invention, by objective function calculated by constructing a graph representing the assignments, and using the longest-path algorithm for obtaining a path over the graph, as further detailed hereinabove (see the flowchart diagrams of FIGS. 1 and 4).

Following is a pseudo-code used in the present example for local optimization of the 30 sets. During optimization, the method recalculates the objective function values for the sets by iteratively calling the longest-path algorithm described in the flowchart diagram of FIG. 4.

In the pseudo-code, nP denotes the total number of sets (satellite trajectories in the present example); T denotes a set containing all the possible assignments (targets to be imaged by at least one satellite); S denotes a subset of T containing all the shared assignments; $V_i$ denotes a collection of sets (satellite trajectories in the present example) containing the ith assignment ($i \in V_i$); $nV_i$ denotes the size (number of components) of $V_i$; nS denotes the size (number of components) of S; $SPO_i$ denotes a call to the objective function for the ith set; and Oi denotes the returned value of the objective function for the ith set. In each section of the pseudo-code, comments are enclosed by braces.

```
Initialization

1.  For j = 1 to nP
        O⁰j = SPOⱼ (T)
    End loop j
2.  S⁰ = S
3.  FLAG = 0  {FLAG serves as an ending flag}
Process the shared assignments 4.  For i = 1 to nS                 {i is a shared assignment index}
     a. For j = 1 to nVᵢ            {j is a trajectory index of the ith assignment}
         i. Vᵢⱼ = Vᵢ − Vᵢ(j)        {exclude the jth component from the collection Vᵢ,
                                     and store the new collection in a matrix Vᵢⱼ}
         ii. Lossᵢⱼ = Σₖ₌₁^{nVi−1} [O⁰ₖ − SPOₖ (Vᵢⱼ)]
                                    {Calculate the loss of the objective function due to
                                     the exclusion of the jth component from the
                                     collection Vi, and store the loss in a matrix Lossᵢⱼ}
        End loop j
5.  Eᵢ = Find (Minⱼ (Lossᵢⱼ) )      {Eᵢ is the index of the minimal component in the ith
                                     row of the matrix Lossᵢⱼ}
6.  If Minⱼ (Lossᵢⱼ) < THRESHOLD then
     a. V⁰ᵢ = Vᵢ − Vᵢ(Eᵢ)           {exclude the component Eᵢ from the collection Vᵢ and
                                     store the new collection in a new collection V⁰ᵢ}
     b. FLAG = 1
    End if
7.  If size(V⁰ᵢ) = 1 then           {if V⁰ᵢ consist of only 1 element}
        S⁰ = S⁰ − S(i)              {eliminate the ith component from subset S}
    End if
    End loop i
Redefine the shared assignments subset 8.  S = S⁰
9.  nS = size (S⁰)
10. V = V⁰
11. Unless nS = 0 or FLAG = 0
    Go to 3                         {repeat the optimization process until the
                                     shared assignments subset is null or there is
                                     no detection of loss which is greater then
                                     THRESHOLD}
12. End
```

Results

Figure 14:
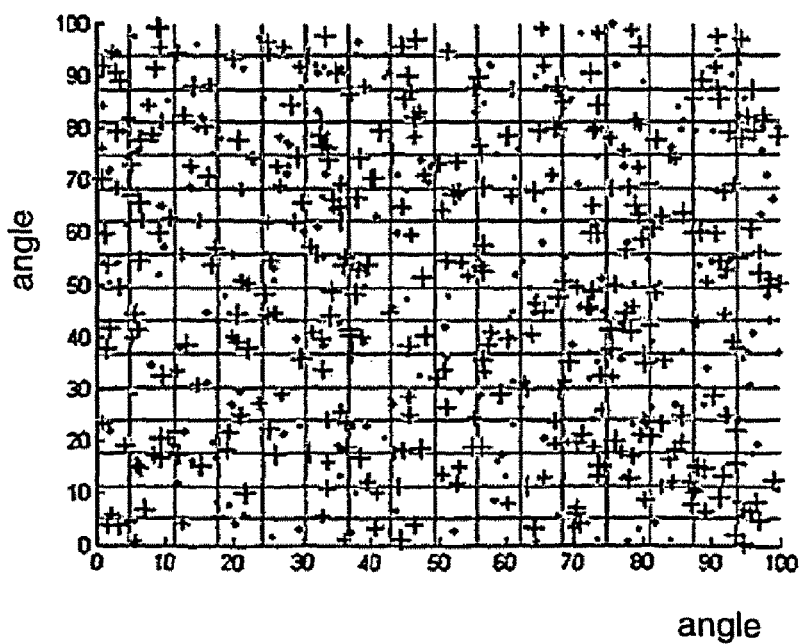
FIG. 14 shows a Cartesian map of 600 targets used as assignments to demonstrate the efficiency of an optimization method according to the teachings of a preferred embodiment of the present invention.

FIG. 14 shows a map of the 600 targets, and the 30 satellite trajectories. The trajectories are shown as horizontal and vertical red lines at different angles.

Figure 15:
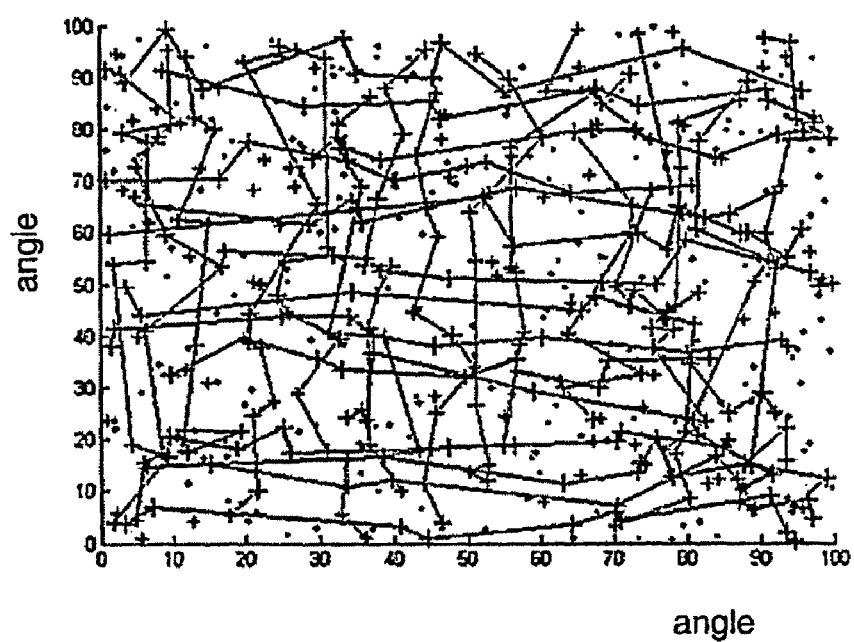
FIG. 15 shows sets of the 600 assignments of FIG. 14, after the optimization.

FIG. 15 shows the sets of assignments after the optimization. Each set is illustrated as a connected path of targets. Note that the number of shared assignments is minimal.

Figure 16A:
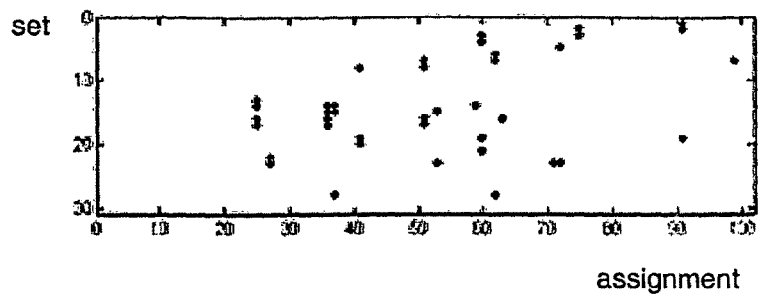
FIGS. 16a-b show an initial ascribing matrix FIG. 16a) and a final ascribing matrix (FIG. 16b) for 100 of the 600 assignments, after 25 iterations.
Figure 16B:
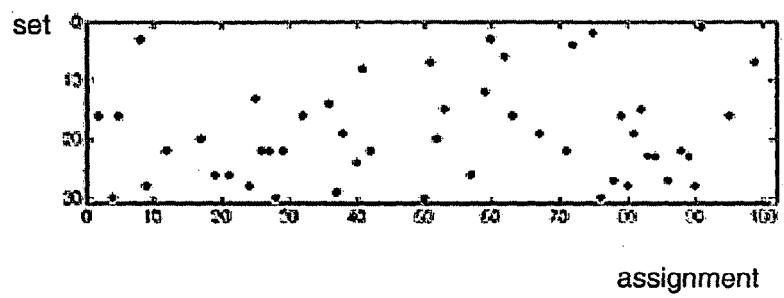

FIGS. 16a-b show the initial (FIG. 16a) and final (FIG. 16b) ascribing matrices for 100 of the 600 assignments, after 25 iterations. The number of zeroes in the initial and final matrices was 40 and 50, respectively. The ascribing matrices are represented in FIGS. 16a-b in assignment-set representations, where each point describes a membership relation of a respective assignment to a respective set. As shown in FIG. 16a, many assignments are elements of more than one set. For example, assignment No. 25 is an element of set Nos. 13, 14 26 and 17, assignment No. 36 is an element of set Nos. 3, 4, 19 and 21, etc. Conversely, as shown in FIG. 16b, after the optimization the spread of points in the assignment-set space is more uniform and there are no shared assignments.

Figure 17:
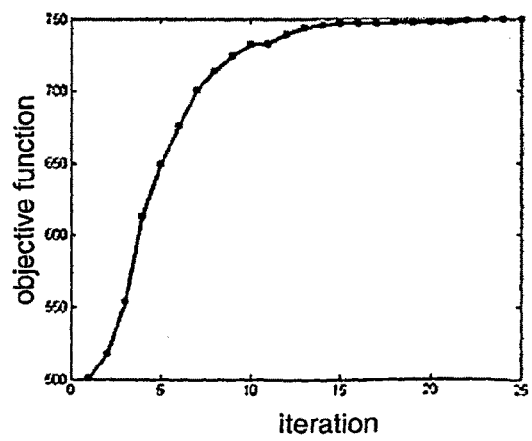
FIG. 17 shows objective function values as a function of the number of iterations, according to a preferred embodiment of the present invention.

FIG. 17 shows the objective function value as a function of the number of iterations. The objective function is a global quantity defined per iteration by assigning, for each shared assignment, a single path which is selected from the set of all paths containing the shared assignment. As shown in FIG. 17, the optimization method of the present embodiments has a fast convergence. After about 10 iterations, the objective function is converged to about 95% of its asymptotic value.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of assigning sets of assignments to at least one agent, the at least one agent being capable of assuming a plurality of states, the method comprising, operating a data processor executing the following program instructions for each said agent;

constructing a graph having a plurality of vertices and a plurality of edges, each vertex of said plurality of vertices representing an assignment performable by said agent while being at a respective state of said plurality of states, and each edge of said plurality of edges connecting two vertices of said plurality of vertices, hence representing a transition between two states of said plurality of states;

assigning a predetermined weight for each vertex of said plurality of vertices; and using a longest-path algorithm for obtaining a path over said graph, said path having a plurality of connected vertices and being characterized by a substantial optimal objective function defined using respective weights of said plurality of connected vertices;

thereby assigning to said agent a set of assignments represented by said plurality of connected vertices of said graph.

2. The method of claim 1, wherein said agent is a satellite.

3. The method of claim 1, wherein said agent is an aircraft.

4. The method of claim 1, wherein said agent is a reading head floating over a surface of a memory medium.

5. The method of claim 2, wherein at least a few states of said plurality of states describe a trajectory of said satellite.

6. The method of claim 2, wherein at least a few states of said plurality of states correspond to different orientations of said satellite at a first location.

7. The method of claim 2, wherein at least one assignment comprises a capture of an image of a predetermined area.

8. The method of claim 7, wherein said image is characterized by at least one parameter selected from the group consisting of a location, a size, an envelope shape, a resolution, a priority and an acquisition type.

9. The method of claim 1, further comprising defining at least one collection of assignments having at least two assignments, said at least two assignments being performable by said agent while being at a single state of the plurality of states.

10. The method of claim 1, further comprising performing an accumulated resources test.

11. The method of claim 1, wherein the at least one agent comprises a plurality of agents, and the sets of assignment comprise a plurality of sets of assignments respectively characterized by a plurality of substantial optimal objective functions, such that each set of assignments is associated with one agent.

12. The method of claim 11, further comprising optimizing said plurality of sets of assignments.

13. The method of claim 12, wherein said optimizing of said plurality of sets of assignments comprises, for each assignment being identified as an element of more than one set:

(a) using a respective portion of the plurality of objective functions for determining a relative weight of each set containing said assignment as compared to an overall weight of other sets containing said assignment; and (b) if said relative weight satisfies a predetermined rejection criterion then excluding said assignment from said set;

thereby optimizing said plurality of sets of assignments.

14. The method of claim 13, further comprising, applying at least one global optimization process to the plurality of sets so as to obtain at least one non-local optimum of the plurality of sets.

15. The method of claim 13, further comprising repeating said steps (a) and (b) using a different rejection criterion.

16. The method of claim 13, further comprising repeating said steps (a) and (b) a plurality of times, each time using a different rejection criterion.

17. A method of assigning sets of assignments to at least one satellite, the method comprising, operating a data processor executing the following program instructions for each said satellite:

determining a trajectory of said satellite;

constructing a graph having a plurality of vertices and a plurality of edges, each vertex of said plurality of vertices representing an assignment performable by said satellite while being located at a location along said trajectory, and each edge of said plurality of edges connecting two vertices of said plurality of vertices, hence representing a propagation of said satellite between two locations along said trajectory;

assigning a predetermined weight for each vertex of said plurality of vertices; and using a longest-path algorithm for obtaining a path over said graph, said path having a plurality of connected vertices and being characterized by a substantial optimal objective function defined using respective weights of said plurality of connected vertices;

thereby assigning to said satellite a set of assignments represented by said plurality of connected vertices of said graph.

18. The method of claim 17, further comprising using said trajectory for defining, for each assignment, a time window at which said assignment is performable by said satellite.

19. The method of claim 17, wherein said satellite is capable of assuming a plurality of orientations.

20. The method of claim 17, further comprising defining additional vertices of said graph in a manner such that each vertex of said graph represent a different combination of time instant and orientation of said satellite.

21. The method of claim 19, wherein at least one assignment comprises a capture of an image of a predetermined area.

22. The method of claim 21, wherein said image is characterized by at least one parameter selected from the group consisting of a location, a size, an envelope shape, a resolution, a priority and an acquisition type.

23. The method of claim 17, further comprising defining at least one collection of assignments having at least two assignments, said at least two assignments being performable by said satellite while being at a single state of the plurality of states.

24. The method of claim 17, further comprising performing an accumulated resources test.

25. The method of claim 17, wherein the at least one satellite comprises a plurality of satellites, and the sets of assignment comprise a plurality of sets of assignments respectively characterized by a plurality of substantial optimal objective functions, such that each set of assignments is associated with one satellite.

26. The method of claim 25, further comprising optimizing said plurality of sets of assignments.

27. The method of claim 26, wherein said optimizing of said plurality of sets of assignments comprises, for each assignment being identified as an element of more than one set:
  (a) using a respective portion of the plurality of objective functions for determining a relative weight of each set containing said assignment as compared to an overall weight of other sets containing said assignment; and
  (b) if said relative weight satisfies a predetermined rejection criterion then excluding said assignment from said set;
thereby optimizing said plurality of sets of assignments.

28. The method of claim 27, further comprising, applying at least one global optimization process to the plurality of sets so as to obtain at least one non-local optimum of the plurality of sets.

29. The method of claim 27, further comprising repeating said steps (a) and (b) using a different rejection criterion.

30. The method of claim 27, further comprising repeating said steps (a) and (b) a plurality of times, each time using a different rejection criterion.

31. An apparatus for assigning sets of assignments to at least one agent, the at least one agent being capable of assuming a plurality of states, the apparatus comprising a data processor, designed and implementing program of instructions, said program of instructions having:

a graph constructor, for constructing, for each agent, a graph having a plurality of vertices and a plurality of edges, each vertex of said plurality of vertices representing an assignment performable by said agent while being at a respective state of said plurality of states, and each edge of said plurality of edges connecting two vertices of said plurality of vertices hence representing a transition between two states of said plurality of states;

a weight assigner, for assigning a predetermined weight for each vertex of said plurality of vertices; and a path optimizer, supplemented by a longest-path algorithm and configured to obtain a path over said graph, wherein said path comprises a plurality of connected vertices and being characterized by a substantial optimal objective function defined using respective weights of said plurality of connected vertices.

32. The apparatus of claim 31, wherein said at least one agent comprise at least one satellite.

33. The apparatus of claim 32, wherein at least a few states of said plurality of states describe a trajectory of said at least one satellite.

34. The apparatus of claim 32, wherein at least a few states of said plurality of states correspond to different orientations of said satellite at a first location.

35. The apparatus of claim 32, wherein at least one assignment comprises a capture of an image of a predetermined area.

36. The apparatus of claim 35, wherein said image is characterized by at least one parameter selected from the group consisting of a location, a size, an envelope shape, a resolution, a priority and an acquisition type.

37. The apparatus of claim 31, further comprising a collection definer for defining at least one collection of assignments having at least two assignments, said at least two assignments being performable by said agent while being at a single state of the plurality of states.

38. The apparatus of claim 31, further comprising a testing unit capable of performing an accumulated resources test.

39. The apparatus of claim 31, wherein the at least one agent comprises a plurality of agents, and the sets of assignment comprise a plurality of sets of assignments respectively characterized by a plurality of substantial optimal objective functions, such that each set of assignments is associated with one agent.

40. The apparatus of claim 39, further comprising an optimization unit for optimizing said plurality of sets of assignments.

41. The apparatus of claim 40, wherein said optimization unit comprises:
  a shared assignments identifier, for identifying shared assignments, said shared assignments being identified as elements of more than one set;
  a relative weight determinator for using a respective portion of the plurality of objective functions to determine a relative weight of each set containing a shared assignment as compared to an overall weight of other sets containing said shared assignment; and
  a conditional excluder for excluding said assignment from said set if said relative weight satisfies a predetermined rejection criterion.

42. The apparatus of claim 41, further comprising, a global optimization unit for applying at least one global optimization process to the plurality of sets so as to obtain at least one non-local optimum of the plurality of sets.

43. An apparatus for assigning sets of assignments to at least one satellite, the apparatus comprising a data processor, designed and implementing a program of instructions, said program of instructions having:
   a trajectory determinator, for determining, for each satellite, a trajectory of said satellite;
   a graph constructor, for constructing a graph having a plurality of vertices and a plurality of edges, each vertex of said plurality of vertices representing an assignment performable by said satellite while being located at a location along said trajectory, and each edge of said plurality of edges connecting two vertices of said plurality of vertices, hence representing a propagation of said satellite between two locations along said trajectory;
   a weight assigner, for assigning a predetermined weight for each vertex of said plurality of vertices; and
   a path optimizer, supplemented by a longest-path algorithm and configured to obtain a path over said graph, said path having a plurality of connected vertices and being characterized by a substantial optimal objective function defined using respective weights of said plurality of connected vertices.

44. The apparatus of claim 43, further comprising a time window definer, communicating with said trajectory determinator and configured to define, for each assignment, a time window at which said assignment is performable by said satellite.

45. The apparatus of claim 43, wherein said satellite is capable of assuming a plurality of orientations.

46. The apparatus of claim 43, wherein said graph constructor is configured to define additional vertices of said graph in a manner such that each vertex of said graph represent a different combination of time instant and orientation of said satellite.

47. The apparatus of claim 43, further comprising a collection definer for defining at least one collection of assignments having at least two assignments, said at least two assignments being performable by said satellite while being at a single state of the plurality of states.

48. The apparatus of claim 43, further comprising a testing unit capable of performing an accumulated resources test.

49. The apparatus of claim 43, wherein the at least one satellite comprises a plurality of satellite, and the sets of assignment comprise a plurality of sets of assignments respectively characterized by a plurality of substantial optimal objective functions, such that each set of assignments is associated with one satellite.

50. The apparatus of claim 49, further comprising an optimization unit for optimizing said plurality of sets of assignments.

51. The apparatus of claim 50, wherein said optimization unit comprises:
   a shared assignments identifier, for identifying shared assignments, said shared assignments being identified as elements of more than one set;
   a relative weight determinator for using a respective portion of the plurality of objective functions to determine a relative weight of each set containing a shared assignment as compared to an overall weight of other sets containing said shared assignment; and
   a conditional excluder for excluding said assignment from said set if said relative weight satisfies a predetermined rejection criterion.

52. The apparatus of claim 51, further comprising, a global optimization unit for applying at least one global optimization process to the plurality of sets so as to obtain at least one non-local optimum of the plurality of sets.

* * * * *